United States Patent
Vincent

(10) Patent No.: US 10,706,149 B1
(45) Date of Patent: Jul. 7, 2020

(54) DETECTING DELAYED ACTIVATION MALWARE USING A PRIMARY CONTROLLER AND PLURAL TIME CONTROLLERS

(71) Applicant: FireEye, Inc., Milpitas, CA (US)

(72) Inventor: Michael Vincent, Sunnyvale, CA (US)

(73) Assignee: FireEye, Inc., Milpitas, CA (US)

(\*) Notice: Subject to any disclaimer, the term of this patent is extended or adjusted under 35 U.S.C. 154(b) by 474 days.

(21) Appl. No.: 15/197,643

(22) Filed: Jun. 29, 2016

Related U.S. Application Data

(60) Provisional application No. 62/235,494, filed on Sep. 30, 2015.

(51) Int. Cl.
*G06F 21/56* (2013.01)
*G06F 9/455* (2018.01)

(52) U.S. Cl.
CPC ........ *G06F 21/566* (2013.01); *G06F 9/45558* (2013.01); *G06F 2009/45587* (2013.01); *G06F 2221/033* (2013.01)

(58) Field of Classification Search
CPC .................................................. G06F 21/566
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Simon P Kanaan
(74) *Attorney, Agent, or Firm* — Rutan & Tucker, LLP

(57) ABSTRACT

A malicious content detection (MCD) system and a computerized method for manipulating time uses two or more time controllers operating within the MCD system in order to capture the behavior of delayed activation malware (time bombs). Each time controller may include a monitoring agent located in a software layer of a computer runtime environment configured to intercept software calls (e.g., API calls or system calls) and/or other time checks that seek to obtain a "current time," and time-dilation action logic located in a different layer (e.g., a hypervisor layer) configured to respond to the software calls by providing a "false" current time that indicates considerably more time has transpired than the real clock. Additionally, a primary controller may be used in some embodiments to configure and manage, the time controllers.

62 Claims, 13 Drawing Sheets

(56) References Cited

U.S. PATENT DOCUMENTS

| | | |
|---|---|---|
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,296,271 B1 | 11/2007 | Chalmer et al. |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |

(56) References Cited

U.S. PATENT DOCUMENTS

| | | |
|---|---|---|
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 * | 9/2014 | Manni .................. G06F 21/566 726/22 |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,246 B1 | 5/2016 | Wan et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,361 B2 * | 8/2016 | Mahaffey ............ H04L 63/0853 |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,489,516 B1 * | 11/2016 | Lu ........................ G06F 21/566 |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,754,103 B1 | 9/2017 | Patel et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |

(56) References Cited

U.S. PATENT DOCUMENTS

| | | |
|---|---|---|
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0073129 A1 | 6/2002 | Wang et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |

(56) References Cited

U.S. PATENT DOCUMENTS

| | | |
|---|---|---|
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0283192 A1* | 12/2007 | Shevchenko ......... G06F 21/554 714/39 |
| 2008/0005782 A1 | 1/2008 | Aziz |
| 2008/0016339 A1* | 1/2008 | Shukla .................... G06F 21/53 713/164 |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0235273 A1 | 9/2008 | Shipilevsky |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0287620 A1* | 11/2010 | Fanton .................... G06F 21/10 726/27 |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0060220 A1 | 3/2012 | Kerseboom et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |

(56) References Cited

U.S. PATENT DOCUMENTS

| | | |
|---|---|---|
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gable et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117849 A1 | 5/2013 | Golshan et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1* | 12/2014 | Paithane ............... G06F 21/566 726/23 |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0205962 A1* | 7/2015 | Swidowski ........... G06F 21/566 726/23 |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0099963 A1* | 4/2016 | Mahaffey ............ H04L 63/0227 726/25 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1* | 11/2016 | Paithane ............... G06F 9/45558 |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |
| WO | 2014/147618 A1 | 9/2014 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

(56) References Cited

OTHER PUBLICATIONS

C. Kolbitsch et al., "The Power of Procrastination: Detection and Mitigation of Execution-Stalling Malicious Code" in Proceedings of the 18th ACM Conference on Computer and Communications Security, 2011, ACM, pp. 1-12.
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—an advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
J. Crandall et al., "Temporal Search: Detecting Hidden Timebombs with Virtual Machines" in Proceedings of 9th International Conference on Architectural Support for Programming Languages and Operating Systems, 2006, ACM, pp. 25-36.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Towards Understanding Malware Behaviour by the Extraction of API Calls, Alazab, M.; Venkataraman, S.; Watters, P. Cybercrime and Trustworthy Computing Workshop (CTC), 2010 Second Year: 2010 pp. 52-59, DOI: 10.1109/CTC.2010.8.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.

(56) References Cited

OTHER PUBLICATIONS

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

U.S. Appl. No. 15/197,647, filed Jun. 29, 2016 Non-Final Office Action dated Jan. 21, 2020.

U.S. Appl. No. 15/197,647, filed Jun. 29, 2016 Final Office Action dated Jul. 15, 2019.

U.S. Appl. No. 15/197,647, filed Jun. 29, 2016 Non-Final Office Action dated Dec. 31, 2018.

\* cited by examiner

# DETECTING DELAYED ACTIVATION MALWARE USING A PRIMARY CONTROLLER AND PLURAL TIME CONTROLLERS

CROSS-REFERENCE TO RELATED APPLICATIONS

This application claims the benefit of priority on U.S. Provisional Application No. 62/235,494 filed Sep. 30, 2015, the entire contents of which are incorporated by reference.

1. FIELD

Embodiments of the disclosure relate to the field of cybersecurity, and more specifically, to techniques that detect delayed activation malware by manipulating time seen by the malware using a controller operating within a computer runtime environment.

2. GENERAL BACKGROUND

Over the last decade, malicious software (malware) has become a pervasive problem. In some situations, malware is an object embedded within downloadable content designed to adversely influence or attack normal operations of a computer. Examples of different types of malware may include computer viruses, Trojan horses, worms, spyware, backdoors, and other programming that operates maliciously within an electronic device (e.g. computer, tablet, smartphone, server, router, wearable technology, or other types of electronics with data processing capability) without permission by the user or an administrator.

For instance, content may be embedded with objects associated with a web page hosted by a malicious web site. By downloading this content, malware causing another web page to be requested from a malicious web site may be unknowingly installed on the computer. Similarly, malware may also be installed on a computer upon receipt or opening of an electronic mail (email) message. For example, an email message may contain an attachment, such as a Portable Document Format (PDF) document, with embedded executable malware. Also, malware may exist in files infected through any of a variety of attack vectors, which are uploaded from an infected computer onto a networked storage device such as a file share.

Over the past few years, various types of security appliances have been deployed at different segments of a network. These security appliances use virtual machines to uncover the presence of malware embedded within ingress content propagating over these different segments. However, in order to be effective in uncovering the malware, the virtual machine (VM) needs to make the suspicious content believe that it has accessed a live machine and not just a VM or "sandbox" environment. Thus, any actions that are performed in the VM or "sandbox" have to be as invisible as possible to malware so that the malware does not detect that it is being processed within a sandbox rather than a production computer system. Further, the VM may only exercise each specimen for a finite amount of time so that it may subsequently analyze as many specimens as possible in as short a period of time as possible. Accordingly, some malicious contents employ special defensive strategies to enable them to delay their own execution in order to bypass the VM uncovering their presence.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1:
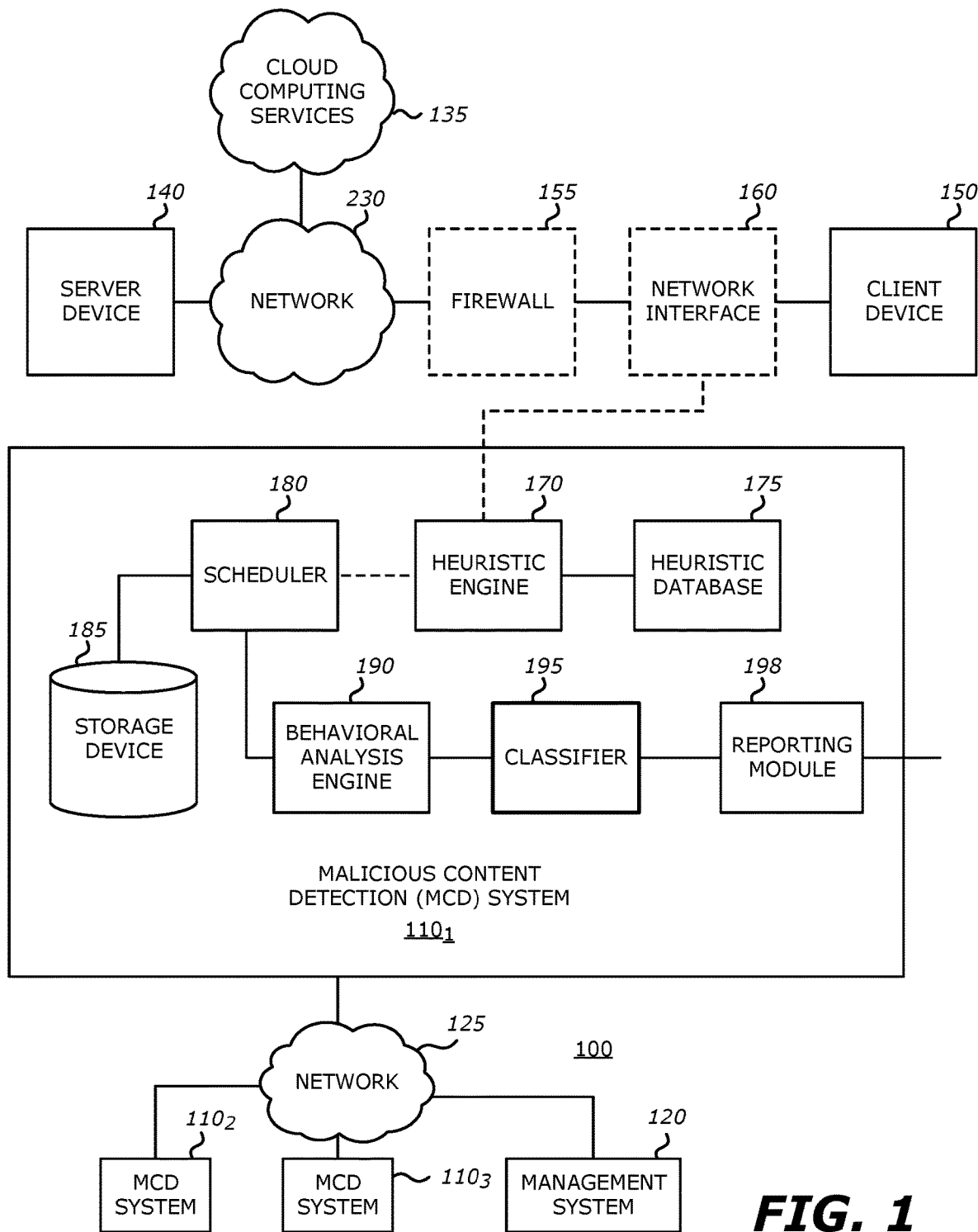
FIG. 1 is a first example block diagram of a network environment that advantageously uses a malware content detection (MCD) system employing both heuristic analysis and behavioral analysis, and deployed within a communication network.

Various embodiments of the disclosure relate to a malicious content detection (MCD) system and a corresponding method for manipulating time using a virtual machine and at least one time controller operating within the MCD system in order to capture and respond to an action (such as a time check) originating from malware that is attempting to delay its own execution. In other embodiments, a primary controller is employed to configure and manage the time controllers pursuant to an action plan.

In some embodiments, to uncover the malware effectively, the malware must first be convinced that it is running on a "live" machine and not in a VM environment that is implemented within the MCD system. For instance, since many malware are able to delay their own execution to bypass the VM's detection, in some embodiments, the MCD system may capture the delayed behavior of the malware by manipulating the time being obtained by the malware. For instance, the malware may delay its own execution in the VM by: (i) checking the current time using a software call (or other time check) to delay completion of its execution (e.g., sleep for 30 minutes), (ii) repeatedly checking whether the time has passed using one or more other software calls (or other time checks), and (iii) executing once it has determined that the delay has passed. To capture this delayed behavior, the MCD system may manipulate the time that is being obtained by the malware to convince it that the delay has passed such that the malware may execute when, in reality, only a short finite amount of time has passed (e.g., less than the delay for which the malware is waiting). Accordingly, embodiments of the invention are operable in order to effectively convince malware that (a) the malware is not in a VM environment, and (b) a manipulated time that is much longer than the real time has elapsed.

More specifically, a content specimen is processed over a short period of time (real time) in the runtime environment but, through the disclosed mechanisms, is led to believe it is processed for a much longer time. This is intended to trick the specimen into activation in the event it constitutes a delayed activation malware (time bomb) so it may be detected and classified as malware by the MCD. More specifically, in some embodiments of the invention, a time controller detects requests from or other time checks by the specimen (or from the process running the specimen) for the current time and provides a "false" time or clock as a response to achieve time dilation.

In various embodiments, the time controller includes one or more modules, logic or agents (which terms may be used interchangeably), each situated, for example, as a user-mode process, as a kernel-mode process, as a process running in or with a hypervisor, functionality embedded in virtual chipsets, and/or in the host operating system ("OS"). These various locations may be referred to as layers in the functional stack of the run-time environment. The time controller includes (a) a monitoring agent located in each of one or more of the layers configured to intercept, trap or, in common jargon, "hook" a software call (e.g., API, library, procedure, function, or system call) or other time check that seeks to check "current time," and (b) time-dilation logic also located in one or more of the layers, each preferably different and "lower" in the stack than the monitoring agent, and configured to respond to the software call or other time check by providing a "false" current time that indicates considerably more time has transpired than the real clock. As an alternative to (or in addition to) the just-mentioned software call-response technique, the time control logic can be equipped to utilize one or more other techniques to establish the "false" time, including periodic or aperiodic polling, and in-memory or "op code" based techniques.

The response to the software call or other time check intercepted by the monitor agent may be made by the time-dilation logic explicitly via the monitoring agent or directly to the requester (e.g., software component, such as a process or operating system) within the software stack, or implicitly by modification of clock information (e.g., in memory) targeted by the software call or other time check, as appropriate and, preferably, as would be expected by malware if the call or time check so originated from malware.

In some embodiments, each time controller may have a set of two or more monitoring agents that share a single time-dilation logic, where the monitoring logic modules may be located in the same layer in the software stack or in different layers. The time-dilation logic can provide the same time dilation clock to all the monitoring modules in the set or provide different time-dilation clocks to each. Moreover, the time-dilation logic may provide time-dilation clocks to each monitoring agents in a fashion that is consistent from agent to agent with respect to establishing the false clock, particularly in so far as the software calls or other techniques used by malware to check time may arrive at somewhat different times and the false time provided in response must account for this difference in order to trick the malware. Moreover the malware may use more than one request (or one or more than one technique) in order to be assured that time manipulation within a malware detector is not taking place.

Various embodiments may employ a virtual run-time environment established, for example, by a hypervisor instantiating one or more virtual machines for processing a specimen. Each virtual machine may execute a guest image including a guest operating system (OS) and an application instance (process). Each monitoring agent and time-dilation logic of a time controller may reside inside one of the following: (i) the guest image (e.g., the specimen or process running in the user space or kernel space of the guest image), (ii) the host OS software, (iii) the hypervisor, or (iv) a virtualized device. Each of these components may be implemented as an independent process in the guest image or on or beneath the host OS. The monitoring agent may be located within any of these, and the time-dilation logic may be co-located (same layer) or may be located, at least in part, in another of these layers, e.g., the monitoring agent may be located closer to the specimen being processed. For example, the monitoring agent may be located within a process (or as a process) of the guest image and the time-dilation logic may be in communication with the monitoring agent and operating within or with the hypervisor. Accordingly, depending on the location of the time controller(s), kernel mode or user mode activities of the guest image may each see a different clock/time or they may all see the same clock/time. Each time controller can be referred to as an "elastic" time controller since its time-dilation logic may be configured to establish "short" or "long" delays. In other words, the time-dilation logic of a time controller can respond to a software call or other time check from a specimen being processed with a response containing a selected "false" time that induces the specimen into believing it has been dormant or inactive for a shorter period of time or a longer period of time depending on detection needs.

The time-dilation logic can decide on the length of delay based on prior results, e.g., static analysis results for the specimen, metadata regarding the specimen, identity of processes running in the run-time environment, experiential knowledge in dealing with known malware, current analysis parameters such as length of the queue of specimens awaiting analysis and contention for resources (e.g., CPU or memory resources), and other factors. The duration of the delay may be a prescribed (fixed) or selectable value. For example, the time-dilation logic may select a delay value from any of various discrete lengths of time (e.g., a 30 minute length, 60 minute length, or two day length) or may select any delay value over a continuous range of available time delays (e.g., 60 minutes to 2 days) and so be fully tunable. The time-dilation logic then adds the delay value to the current time indicated by the clock (e.g., system clock or timestamp) it receives or utilizes, so as to fashion a new, "false" current time for responding to the time request/check from the specimen. Future time requests/checks received while processing the same specimen will take into account the delay introduced during the first response so as to provide a consistent clock and prevent malware from detecting that it is being analyzed (or at least reduce the chances of detection). In some embodiments, the length of delay (increment) may be parameterized and a configuration file may provide values for such time ranges and periods, and be updated, for example, by downloading replacement or modifications to the configuration file from a central source.

Additionally, in one embodiment, the MCD may include a primary controller with configuration, policy, and management logic adapted to communicate with and configure (e.g., provide the rules, policies, and otherwise manage) each of the time controllers. The primary controller may selectively enable/disable one or more of the time controllers to monitor and/or respond to the software calls or other time checks, employing one or more of the techniques mentioned herein. Individual time controllers may be entirely enabled or disabled, or partially enabled or disabled. Partial enablement may denote that the time controller is limited in operation, for example, to introduce only a prescribed and fixed delay time, e.g., a short delay of fixed duration, or to provide time dilation regardless of any observed behaviors of a particular specimen. The primary controller may be implemented, for example, as part of a VM monitor or manager (VMM), also referred to as a hypervisor, which manages VMs, or, in some embodiments, may be functionally integrated into one of the time controllers.

With some of these options and embodiments, a single process (including any and all its threads) in the run-time environment, (e.g., a virtual machine) will see the same length of time dilation, which occurs when the primary controller enables a time controller located for example within that process, proximate the process (e.g., within an independent monitoring process associated with the process), or within any kernel routines servicing the process. In others, a set of processes (e.g., running in a like number of VMs) will see the same length of time dilation, which occurs when the primary controller enables a time controller located for example in the guest OS software for the VM. In still others, the entire virtualized computer (e.g., in one or more VMs) will see a system-wide time dilation (i.e., a delay added to the system clock), which occurs when the primary controller enable a time controller located for example in the hypervisor or the host operating system.

In some embodiments, the primary controller can enable a plurality of time controllers, each with monitoring agent at least in part in a different layer of the functional software stack within the virtual environment. This produces essentially a nesting of enabled time controllers where each may add a time delay relative to the system clock or timestamp so as to produce an aggregated delay that may be greater than that available from any of the time controllers individually. The primary controller may selectively enable one or another (or more than one) of the time controllers (and thus one or more of their respective monitoring agent) so as to "hide" more effectively the time dilation from the malware in analysis. Additionally, in still another embodiment, the primary controller can selectively, and even dynamically (during run-time) associate a time-dilation logic of any of the time controllers with one or more monitoring agents of different time controllers so as to control from any location in which a time-dilation logic is located a number of different monitor agents often located in different layers. This technique may enhance the ability of the MCD to avoid the special defensive strategies employed by some malware to detect that they are located in a malware detection system.

The primary time controller may make decisions as to what technique to employ based on runtime policies or rules. These policies can be static (e.g., factory set), MCD dependent (e.g., dependent on where the MCD is installed in a network), dynamic, e.g., dependent on recent history of malware abilities or trends (e.g., recent known malware remaining inactive for a known number of hours before activation) as detected by the MCD or furnished from other sources, or user set (e.g., by network or security administrators). To illustrate, as a specimen runs, the primary time controller may decide to apply elastic time based on monitored behaviors, and on human experiential knowledge (experienced human analysts) or machine learning (using labelled/known specimens of malware and non-malware and extrapolating to future unknown/unlabeled specimens) to determine optimal time controller configurations.

In one embodiment, the primary time controller formulates and stores an action plan for exercising a specimen so as to trigger activity of malware (if present), and then enables the time controllers to execute the action plan. The action plan may specify using one or more available techniques, one or more available time controllers, specific mappings of time-dilation logic to one or more monitoring agents, and/or specific delay value(s), to cause the process (or the system running the process) to sleep for a period of virtual time and re-awake afterwards to activate malware. This is accomplished while only, e.g., seconds or minutes have passed in real time, instead of, e g., hours or days in "malware time." The technique and length of time dilation may be selected based on rules, e.g., developed using experiential knowledge of prior malware employing delayed activation techniques, etc.

Accordingly, in some embodiments, each time controller can dilate or shrink the "sleep" time of the specimen so as to control apparent time dilation. This is accomplished, in various embodiments, by a) modifying clocks, b) modifying software call responses, c) updating memory, d) using an alternative kernel scheduler, e) using chipset level delays, e.g., introducing a sleep or hibernation event on a system-wide basis, or f) any combination of the above. Embodiments of the invention may provide a hybrid solution that strives to obtain the benefits of each of these different techniques, may select dynamically from them, and/or dynamically configure them during run time. The dynamic configuration may be based on external configuration sources or on behavior (or lack of behavior) of a specimen under analysis as monitored by the DMC and/or as previously captured for the specimen.

Embodiments of the invention may be embedded in or employed by a dedicated appliance, a network device such as a firewall, a host system, an endpoint or other node of a network, or other electronic device, whether in-line, out-of-band, in production, off-line, or serving as a forensic station or a cloud-based or partially cloud based solution. The operational flexibility provided by these embodiments enables malware to be detected efficiently and without the malware's own detection defense or evasion systems becoming aware of the replacement clock time, thereby increasing the probability that the malware will activate during analysis.

The embodiments of the invention disclosed herein represent significant improvements over traditional techniques for monitoring specimens processed in a VM-based malware detector, and detecting delayed-activation malware.

U.S. Pat. No. 8,635,696 entitled "System and Method of Detecting Time-Delayed Malicious Traffic," is issued to Ashar Aziz, and commonly assigned with the present case to FireEye, Inc. That patent describes a malware detection system having a controller configured to monitor behavior of a VM in response to processing of network traffic within the VM, and identify anomalous behavior by accelerating activities caused by the network traffic to reduce time for detection. Based on the identified anomalous behavior, the controller determines the presence of time-delayed malicious traffic. The controller accelerates the activities of the network traffic in the VM, for example, by intercepting one or more time-sensitive system calls and modifying one or more responses to the system calls. A known prior art implementation of such technology for monitoring behavior of a VM employs one or more monitors within the guest software image of the VM (and particularly in one or more processes of the operating system), where each monitor is a self-contained entity equipped to intercept time-sensitive system calls and the like, employ its own logic within the same entity to formulate a modified response so as to accelerate activities within the VM, and deliver the modified response to the requester.

Embodiments of the instant invention have many benefits over the known prior art. First, the monitoring logic can be fashioned as a thin or light-weight agent, whose responsibilities are limited to intercepting or trapping software calls or otherwise "hooking" either other time checks or programmatic mechanisms leading to time checks (e.g., breakpoints or exceptions), and delivering responses to the time checks containing an altered time. The logic required to fashion the responses is moved outside the monitoring agent to the time-dilation logic. Second, the two separate entities, that is, the thin monitoring agent and the time-dilation logic, can permit them to be situated in separate layers of the functional stack within or even outside the VM. This combination of features renders the monitoring agent less likely to be detected by malware, achieves more flexibility in detection as to where the components are placed and their view of the behaviors of the content under analysis, enables the provision of coordinated time clocks to deceive malware using a variety of techniques, and provides flexibility in control of responses across monitoring agents or even across multiple time controllers, to list but a few of the advantages further described here.

As noted, the monitoring agent can be placed in a variety of locations in the software stack. Where the monitoring agent is located in the guest image, e.g., in user mode space, and in close proximity to any content processed there, the monitoring agent can obtain specific context information regarding that processing that may be useful in classifying the content as malware. Unfortunately, such location may render the monitoring agent at higher jeopardy of being discovered by the malware, and particularly today's more sophisticated malware that may employ its defense mechanisms to defeat its detection. On the other hand, where the monitoring agent is located farther down the software stack from the content being processed, e.g., in the hypervisor or host operating system layers, some context information may not lend itself to capture by the monitoring agent but the monitoring agent itself may be less prone to discovery by malware. Embodiments of the invention may balance these two factors, with some emphasizing cloaking of the malware detection environment and others emphasizing collection of detection information or faster detection.

II. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information transmitted as one or more messages, where each message(s) may be in the form of a packet, a frame, an Asynchronous Transfer Mode "ATM" cell, or any other series of bits having a prescribed format. The content may include one or more types of data such as text, software, images, audio, metadata and/or other digital data. One example of content may include web content, or any data traffic that may be transmitted using a Hypertext Transfer Protocol (HTTP), Hypertext Markup Language (HTML) protocol, or may be transmitted in a manner suitable for display on a Web browser software application.

Another example of content includes electronic mail (email), which may be transmitted using an email protocol such as Simple Mail Transfer Protocol (SMTP), Post Office Protocol version 3 (POP3), or Internet Message Access Protocol (IMAP4). A further example of network content includes an Instant Message, which may be transmitted using Session Initiation Protocol (SIP) or Extensible Messaging and Presence Protocol (XMPP) for example. Yet another example of content includes one or more files that are transferred using a data transfer protocol such as File Transfer Protocol (FTP) for subsequent storage on a file share.

The term "malware" may be construed broadly as any computer code that initiates a malicious attack and/or operations associated with anomalous or undesirable behavior. For instance, malware, as used herein, may correspond to a type of malicious computer code that executes an exploit to take advantage of a vulnerability, for example, to harm or co-opt operation of a network device or misappropriate, modify or delete data. The vulnerability may exist in software running on an electronic device and/or may arise from an action by a person that permits the malware to gain unauthorized access to one or more areas of computer infrastructure such as the electronic device itself or another electronic device or computer resource. Upon gaining access, the malware may carry out its harmful or unwanted action.

The term "transmission medium" is a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine (VM)" is a simulation of an electronic device (abstract or real) that is usually different from the electronic device conducting the simulation. VM may be based on specifications of a hypothetical computer or emulate the computer architecture and functions of a real world computer. A VM can be one of many different types such as, for example, hardware emulation, full virtualization, para-virtualization, and operating system-level virtualization virtual machines.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture of Illustrative MCD System

Referring to FIG. 1, an example block diagram of a communication system 100 deploying a plurality of malware content detection (MCD) systems $110_1$-$110_N$ (N>1) communicatively coupled to a management system 120 via a network 125 is shown. In general, management system 120 is adapted to manage MCD systems $110_1$-$110_N$. For instance, management system 120 may be adapted to cause malware indicators generated by any of MCD systems $110_1$-$110_N$ to be shared with one or more of the other MCD systems $110_1$-$110_N$ for malware blocking purposes, including, for example, where such sharing is conducted on a subscription basis.

Herein, according to this embodiment of the invention, first MCD system $110_1$ is an electronic device that is adapted to use a hybrid (or multi-layer) technique to detect malware that is delaying its own execution to bypass detection by a run-time environment of a malware detection system, established for example as a VM-based virtual environment. Specifically, according to this embodiment, the first MCD system $110_1$ is adapted to: (i) trap by a time controller monitoring agent 230 located, e.g., in the guest image of the VM, an action (e.g., a software call) by a specimen indicating that the specimen may be seeking to delay its own execution, (ii) communicate by the time controller the trap of the action or call to the time controller time-dilation logic 232, e.g., in the hypervisor or VMM 200, (iii) generate a command or other response to the trapped action so to perform a modification of the time (e.g., dilation or skewing of time) in a predictable manner for a predetermined period of time, (iv) receiving the modified time at the controller monitoring agent 230 and providing the response to the trap to the entity originating the action or call, and (v) processing the specimen with respect to the modified time. Accordingly, the hybrid technique uses both the time controller monitoring agent and the separate time controller time-dilation logic to detect the malicious code by manipulating time.

According to this embodiment of communication system 100, first MCD system $110_1$ may be a web-based security appliance that is configured to inspect ingress data traffic, identify whether content associated with the data traffic may include malware ("suspiciousness"), and if so, conduct a deeper analysis of the content. This deeper analysis is conducted by processing the content within the VM execution environment to detect undesired behaviors that would be present if the data traffic were actually processed by an electronic device. The particulars of this analysis are described below.

The communication network 130 may include a public computer network such as the Internet, in which case an optional firewall 155 (represented by dashed lines) may be interposed between communication network 130 and client device 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (referred to as a "tap") that is configured to receive data traffic propagating to/from the client device 150 and provide content from the data traffic to the first MCD system $110_1$.

In general, the network interface 160 receives and copies the content normally without an appreciable decline in performance by the communication network 130. The network interface 160 may copy any portion of the content, for example, any number of data packets. In some embodiments, the network interface 160 may capture metadata from data traffic intended for client device 150, where the metadata is used to determine whether the data traffic includes any suspicious content as well as the software profile for such content. The metadata may be associated with the server device 140 and/or the client device 150. In other embodiments, a heuristic module 170 (described herein) may determine the software profile by analyzing the content associated with the data traffic.

It is contemplated that, for any embodiments where the first MCD system $110_1$ is implemented as an dedicated computing appliance or a general-purpose computer system, the network interface 160 may include an assembly integrated into the appliance or computer system that includes network ports, network interface card and related logic (not shown) for connecting to the communication network 130 to non-disruptively "tap" data traffic propagating through firewall 155 and provide a copy of the data traffic to the heuristic module 170. In other embodiments, the network interface 160 can be integrated into an intermediary device in the communication path (e.g. firewall 155, router, switch or other network device) or can be a standalone component, such as an appropriate commercially available network tap.

In virtual environments, a virtual tap (vTAP) can be used to copy traffic from virtual networks.

Referring still to FIG. 1, first MCD system $110_1$ may include a heuristic engine 170, a heuristics database 175, a scheduler 180, a storage device 185, a behavioral analysis engine 190, a classifier 190, and a reporting module 198. In some embodiments, the network interface 160 may be contained within the first MCD system $110_1$. Also, heuristic engine 170, scheduler 180, behavioral analysis engine 190, classifier 195 and reporting module 198 may be software modules executed by a processor (e.g., central processing unit (CPU) 1202 of FIG. 12) that receives the suspicious content, performs malware analysis and is adapted to access one or more non-transitory storage mediums operating as heuristic database 175 and storage device 185. Storage device 185 stores information regarding observed behaviors, analysis results, configuration and management, as will be better understood from the description that follows.

In general, the heuristic engine 170 performs static scanning of a file to determine whether objects within the file may include malware or exploits (e.g. portions of content that may contain or be exploited by malware), vulnerable functions, and/or malicious patterns (e.g. shell code patterns, ROP patterns, heap spray patterns, etc.). The term "file" is used for convenience broadly to include network traffic (such as webpages, emails or data flows), executables, non-executables (e.g., documents) and other content. The term "data flow" is used to specify a collection of related packets (e.g., messages) communicated during a single communicated session between a sending and receiving device.

As illustrated in FIG. 1, the heuristic engine 170 receives the copy of incoming content from the network interface 160 and applies heuristics to determine if any of the content is "suspicious". The heuristics applied by the heuristic engine 170 may be based on data and/or rules stored in the heuristics database 175. Also, the heuristic engine 170 may examine the image of the captured content without executing or opening the captured content. In some embodiments, the static scanning performed by the heuristic engine 170 may include (i) performing an exploit check, which may apply malware-related rules or statistics to the content or involve a comparison of the content against one or more pre-stored exploit signatures (pre-configured and predetermined attack patterns), and/or (ii) performing a vulnerability or anomaly check, which may involve uncovering deviations in messaging practices set forth in applicable communication protocols (e.g., HTTP, TCP, etc.).

After static scanning by the heuristic engine 170, the captured content may be presented to the behavioral analysis engine 190 for more in-depth analysis using virtual machine (VM) technology for processing of the file in a run-time environment in which one or more applications are executed (not just emulated). The ensuing processing may be conducted for a period of time that is either fixed or variable, and may be set manually by an administrator or automatically by the MCD system $110_1$, for example, based on the type of file, queue length of files to be analyzed, or other analysis parameters (such as the results of the heuristic engine 170). For this purpose, the heuristics engine 170 communicates with the scheduler 180.

The scheduler 180 may retrieve and configure a virtual machine (VM) to mimic the pertinent performance characteristics of the client device 150. In one example, the scheduler 180 may be adapted to configure the characteristics of the VM to mimic only those features of the client device 150 that are affected by the data traffic copied by the network interface 160. The scheduler 180 (or the heuristic engine 170, depending on the embodiment) may determine the features of the client device 150 that are affected by the content by receiving and analyzing the network traffic from the network interface 160. Such features of the client device 150 may include ports that are to receive the content, certain device drivers that are to respond to the content, and any other devices coupled to or contained within the client device 150 that can respond to the content. In another embodiment, the scheduler 180 configures the VM with software referred to as a software profile, which is suitable for processing the file. The software profile may include an application, an operating system and a time controller, or at least its monitoring module (see FIG. 2), as described below. For example, the VM may be provisioned with an Internet browser where the file constitutes a webpage, with an email application where the file constitutes an email, and with an appropriate document reader where the file constitutes a Microsoft® Office® document or PDF. In some embodiments, various software profiles may be stored in the MCD system, and an individual software profile selected for use by the scheduler 180 for initiating a VM instance for processing the file. The MCD can be thought of as storing a pool of VMs, and the scheduler 180 as selecting the appropriately provisioned VM from the pool, where the VM pool exists in a logical sense.

The behavioral analysis engine 190 may be adapted to execute one or more VMs to simulate the receipt and/or processing of different potentially "malicious" objects within a file under analysis (analyzed file) within a run-time environment as expected by the type of file, as noted above. The run-time environment may be one selected to mimic one that is prevalently provided by client devices, or, in alternative embodiments, one that can be provided by the client device 150 in particular. Furthermore, the behavioral analysis engine 190 analyzes the activities of the file while it is processed in the run-time environment, in other words, the effects of such content upon the run-time environment, such as the client device 150. Such behavior or effects may include unusual network transmissions, unusual changes in performance, and the like. This detection process is referred to as a dynamic malicious content detection. The behavioral analysis engine 190 stores these behaviors or effects in the storage device 185, which may comprise virtual storage.

A classifier 195 is operable to determine, based on the observed or monitored behaviors or effects, whether the file is or contains malware. A reporting module 198 may issue alerts indicating the presence of malware, and may include pointers and other reference information to identify and provide analytical information on the files under analysis. Additionally, the server device 140 may be added to a list of malicious network content providers, and future network transmissions originating from the server device 140 may be blocked from reaching their intended destinations, e.g., by firewall 155 or another device including a malware detection/blocking system. To that end, the MCD may generate a malware indicator reflecting the file contents (e.g., a hash of a portion of the contents), a malicious server identifier, and/or observed characteristics and behavior of the malware.

Figure 2:
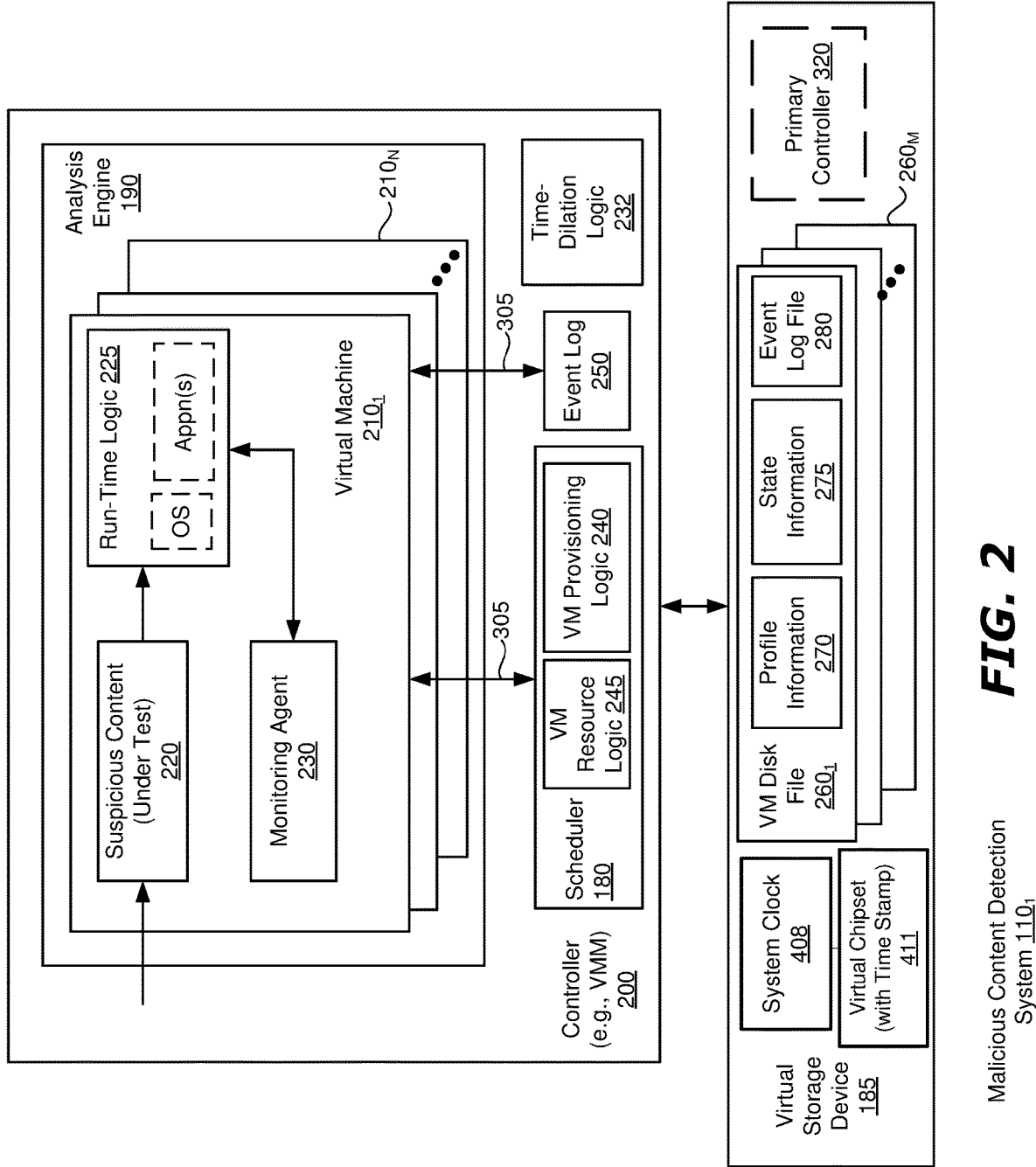
FIG. 2 is a detailed example block diagram of the behavioral analysis components of the MCD system of FIG. 1 in accordance with an embodiment of the invention.
Figure 3:
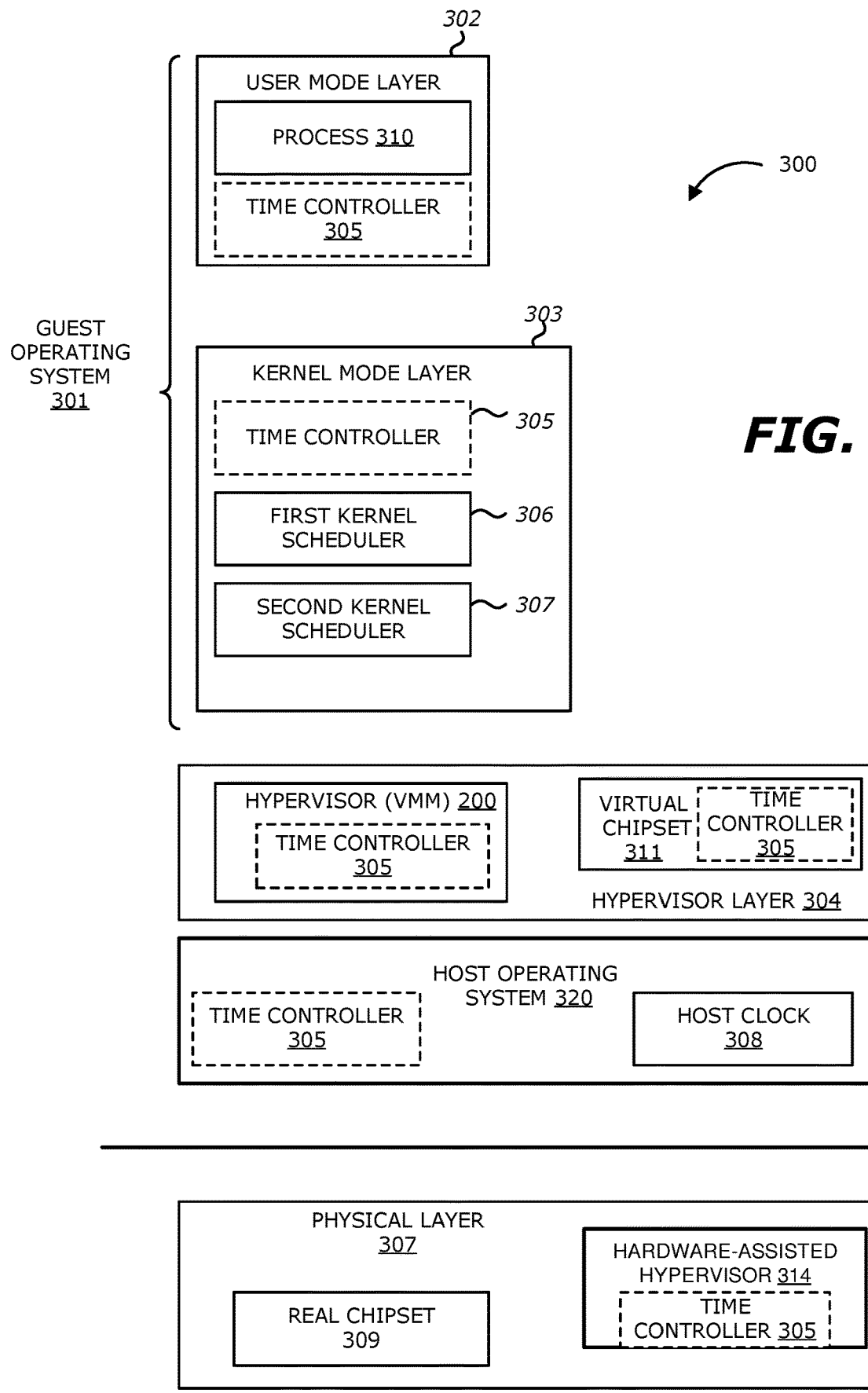
FIG. 3 is an example block diagram that illustrates the functional stack of layers of the MCD system of FIG. 1 that may include one or more time controllers in accordance with an embodiment of the invention.

Further details of embodiments of the behavioral analysis engine 190 and its run-time environment can be had with reference to FIGS. 2 and 3.

Of course, in lieu of or in addition to static scanning operations being conducted by MCD systems $110_1$-$110_N$, it is contemplated that cloud-based computing services may be implemented to perform such static scanning: deconstruct a file for static scanning; conduct static scans on one or more objects within the deconstructed file(s); and/or perform emulation on any of these objects, as described herein. Alternatively, the dynamic analysis performed by the behavioral analysis engine 190 together with malware classification and reporting may be provided by cloud-based computing services. In accordance with this embodiment, MCD system $110_1$ may be adapted to establish secured communications with cloud-based computing services for exchanging information.

Referring now to FIG. 2, a detailed block diagram of the MCD system $110_1$ according to one embodiment of the invention is shown. Herein, the MCD system $110_1$ comprises the storage device 185 coupled to a detection controller 200 via a transmission medium 205. Detection controller 200 is configured to manage and/or control one or more virtual machines (VMs) $210_1$-$210_N$ (N≥1) operating within behavioral analysis engine 190. Information associated with VMs $210_1$-$210_N$ is stored in storage device 185 in a form of VM disk files $260_1$-$260_M$ (N≥M≥1). Herein, detection controller 200 may be implemented as part of a VM monitor or manager (VMM), also referred to as a hypervisor for managing one or more VMs, which may be hosted by a host OS. The VMs $210_1$-$210_N$ may each be configured with a guest OS and one or more application instances (processes). The host OS and the guest OS may be the same type of operating systems or different types of operating systems (e.g., Windows™, Linux™, Unix™, Mac OS™, iOS™, etc.) or different versions thereof.

Each VM disk file (e.g., VM disk file $260_1$) comprises information, including (i) profile information 270 and (ii) state information 275, along with a persistent event log file 280. Event log file 280 is adapted to persistently store certain actions, activities or behaviors (called "events") monitored during processing of the suspicious content 220 during execution of a VM based on the software profile 270. The terms "activity", "action" and "behavior" when referring to detected processing events may be used interchangeably in this description of embodiments of the invention.

Herein, as illustrated, profile information 270 includes information directed to identified items forming the software profile within VM disk file $260_1$ from which a corresponding VM is instantiated. Examples of items within the software profile may include, but are not limited or restricted to a particular OS type/version; type(s)/version(s) of application(s) and state information 275. Additionally, the profile information 270 may contain information regarding location of time controllers (including the monitors and time-dilation logic) within the run-time environment.

The storage device 185 may further include, a system clock 408 and virtual chipset 411 including, in some embodiments, a virtual CPU) instantiated in or capable of being supported by a corresponding VM. In some embodiments, the system clock 408 may be contained in the virtual chipset 411.

According to one embodiment of the invention, when suspicious content 220 is received for dynamic analysis (as opposed to static analysis conducted by heuristic engine 170), scheduler 180 of detection controller 200 is configured to identify and select one or more VMs $210_1$-$210_N$ in which the suspicious content 220 is to be analyzed. The targeted operating environment is identified by software profile information (e.g., particular versions of OS and application images along with information directed to the virtual device states). The targeted operating environment may also include a time controller, or at least its monitoring module 230, as described below.

More specifically, the scheduler 180 comprises VM provisioning logic 240 and VM resource logic 245. VM provisioning logic 240 is responsible for creating and provisioning VMs. VM resource logic 245 operates as the centralized logic within the MCD system for responding to resource requests, allocating resources, and monitoring the allocation of such resources.

Upon receipt of the software profile by the behavioral analysis engine 190, the scheduler 180 launches a VM $210_1$ in which a monitoring module 230 may be running and configured to monitor activities of suspicious content 220 useful in determining whether the incoming content includes malware and whether the particular software profile has any vulnerabilities that are being exploited. In addition, monitoring module 230 maintains a persistent communication channel with event log 250 of detection controller 200 to communicate certain monitored behaviors (events) of suspicious content 220 during execution of VM $210_1$.

In response to detecting certain events during processing of suspicious content 220, the monitoring module 230 is configured to send a message via the communication channel to event log 250, where the message may be persistently recorded as part of event log file 280. The message may include information identifying the event. Event log 250 records events that have been selectively monitored and detected by monitoring module 230, including undesired behaviors. The recordation of the events may be prompted in response to a particular action (e.g., file creation, registry access, and process execution). The recorded events may be subsequently evaluated by classifier 195 (FIG. 1) based on a set of rules or policies to determine whether suspicious content 220 should be classified as containing or constituting malware or, more precisely, as having a high likelihood of containing or constituting malware.

IV. Example Embodiments for Time Manipulation by the MCD System

As discussed above, in order to capture the behavior of the suspicious content's delayed action, the VM $210_1$ may manipulate time such that the suspicious content believes that the manipulated time (that is greater than the real time) has elapsed. Accordingly, the suspicious content will mistakenly believe that the action has been delayed for the desired amount of time and execute the action which may be captured by the VM $210_1$. In some embodiments, parts of the time controllers located in multiple layers of the MCD system $110_1$ are used to create a hybrid (multi-layer) techniques that manipulates time to capture the suspicious content's delayed action.

Referring to FIG. 3, an illustrative functional stack (called, for convenience, a "software stack") 300 of the MCD system $110_1$ of FIG. 1 with its various layers is depicted in an example arrangement. It will be apparent to those of ordinary skill in the art that alternative arrangements of the software stack of the MCD system may be deployed, and therefore the one depicted in this figure, including its composition and order in the stack, is not intended to be limiting of the scope of the invention. Proceeding from the top of the figure, the guest OS 301 includes the guest user mode layer 302 that sits above the guest kernel mode layer 303. In some embodiments, the guest kernel mode layer 303 includes first and second kernel schedulers 306, 307, which will be described hereinbelow. The guest user mode layer 302 includes at least one process 310. Beneath the guest operating system 301, and in communication therewith, a hypervisor layer 304 includes a hypervisor or VMM 200. Beneath the hypervisor layer 304 and in communication therewith, a host OS 420 includes host clock 308 and a virtual chipset 311 (which may include a virtual CPU, memory, virtual disk, timestamp, etc.). Beneath the host OS 420 and in communication therewith is a physical layer 307 including a real chipset 309, which may include the CPU 1202 of FIG. 12 and other devices. A hardware-assisted hypervisor 314 enables virtualization based, at least in part, on hardware capabilities from the physical layer 307 and in particular from processors implemented as part of the CPU, and may, in some implementations, include components implements as part of both the CUP and the host operating system 320. Finally, and importantly, each of at least a set (e.g., two or more) of the layers of the software stack 300 includes at least part of a time controller 305, as represented by dash boxes in the figure. Different embodiments may use different numbers and locations of time controllers, as will be apparent from the description included herein. The layers of the software stack 300 of the MCD system $110_1$ as illustrated in FIG. 3 are further discussed below.

In FIG. 3, the time controller 305 is illustrated to be logic such as executable code or other logic that may reside in one or more layers. In various embodiments, the time controller 305 may be implemented, in whole or in part, as follows:
 a. inside at the user mode layer 301 as part of or operable in association with user-mode process 410;
 b. inside the guest OS 301 at the guest kernel mode layer 303 as part of or operable in association with the guest OS;
 c. inside the host OS layer as part of or operable in association with the host OS 320 (or host OS software stack);
 d. inside the hypervisor layer 304 as part of or operable in association with the hypervisor 200;
 e. as part of or operable in association with the virtual chipset 311 (e.g., virtualized devices); and/or
 f. as an independent running process running on the Guest OS 320.

Accordingly, the time controller's logic allows for the trapping of an action (e.g., a time check such as a time-related request (software call)) by monitoring agent followed by time dilation via the time-dilation logic as implemented in or across one or more layers of the software stack. More specifically, the monitoring agent 230 of the time controller 305 may be located in any of the layers described in (a) through (f) above to detect the action as seen or produced at that layer. The time-dilation logic 232 can be located at a different and, in many embodiments, lower layer in the software stack 300, along with its configuration, policy, and management logic.

Figure 10:
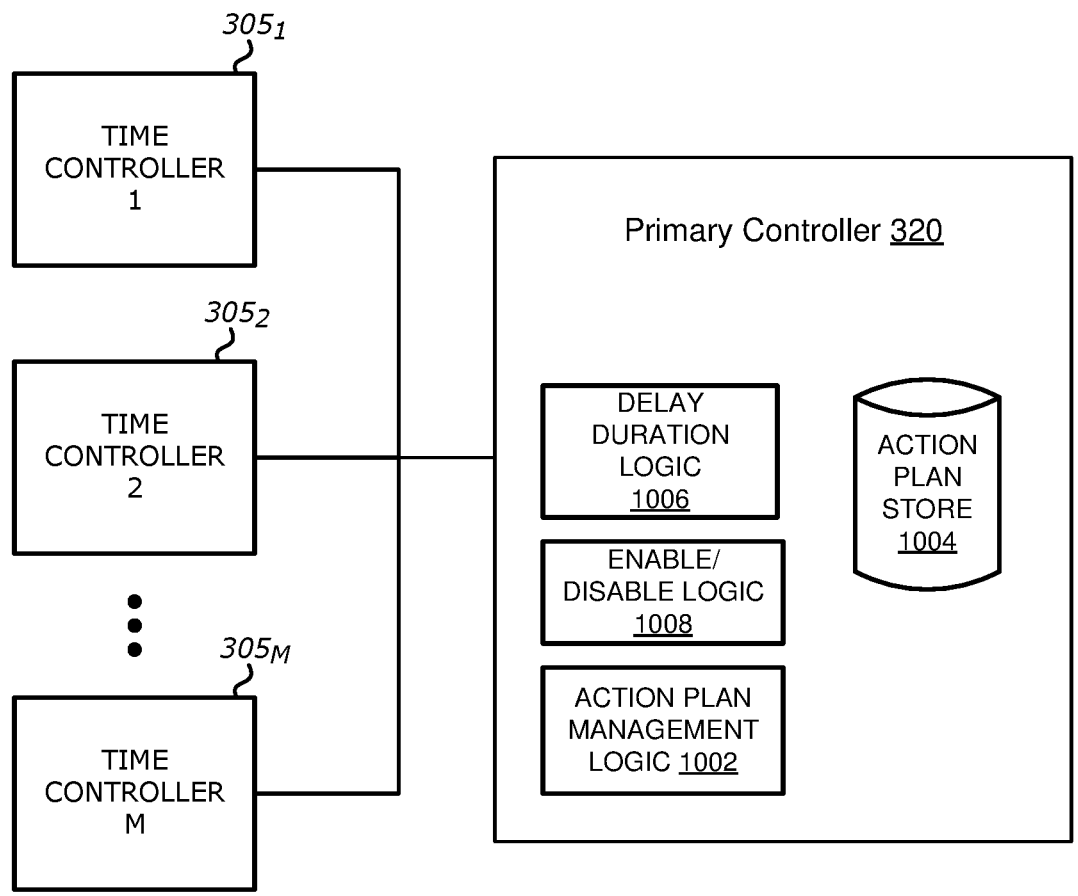
FIG. 10 show an example block diagram that illustrates a primary controller employed to configure a plurality of time controllers according to one embodiment of the invention.

The time controller 305 may be configured by runtime policies. Accordingly, the time controller 305 may be entirely enabled or disabled, may be partially enabled or disabled, and may be dynamically configured in accordance to the runtime policies. In some embodiments, the time controller may be dynamically configured based on (i) configuration sources that are external to the VM or (ii) the detection of behavior or lack of behavior by the specimen being assessed inside the VM. Configuring the time controllers 305 can be performed by an administrator or security personnel via a user interface or, in other embodiments, by primary controller (FIG. 10).

In one embodiment, the MCD system $110_1$ illustrated in FIG. 2 may be located at a proprietary network of an enterprise or other organization, e.g., at an ingress point into the network or a network segment. However, it is contemplated that in another embodiment, the malware detection system employing the inventive concept may be situated as part of an off-line (or out-of-band) automated malware discovery sensor, for example, so as to detect malware contained in data at rest (e.g., stored data or files) or to perform deeper forensic analysis of content, possible as a cloud-based service.

V. Common Approaches Used by Malware to its Own Delay Activation

The objective of the "time bomb" types of malware is to delay completion of execution of its malicious code so they may avoid detection or activate at an opportune time, and they may employ a number of different approaches to achieving this. These may include: (1) making an software (e.g., API) call that is transferred from the guest user mode layer to the guest kernel mode layer for handling, (2) including assembly code that requests the number of clock cycles (ticks) directly from the CPU or the virtual CPU included in the virtual chipset, and (3) making a software call (e.g., library call) serviced in the guest user mode layer. These three delay approaches will now be detail along with the techniques employed by embodiments of the invention in dealing with them to facilitate detecting time-delayed malware.

(1) API Call Transferred from the Guest User Mode Layer to the Guest Kernel Mode Layer In the first delay approach known to be used by malware, the malware makes an API call to delay execution of its malicious code. The API call may be, for instance, sleep, wait for a single object, wait for multiple objects, or another call that serves to signal the task scheduler to tell the OS that it is going to run a code in the future, etc. The API calls may also be effected by lower level calls specific to an operating system such as, for example, delay execution, or yield. Generally speaking, using these time-based API calls, the malware instructs the infiltrated computing device not to run/execute its malicious code for a period of time. These API calls are transferred into the kernel mode layer such that they become system calls.

(2) Assembly Code that Makes Time-Related Requests Directly from the Virtual Chipset In the second delay approach, the malware may include opcodes (or machine code) to effect a delay. For example, the malware may use a low level machine instruction call such as the opcode "rdtsc" (read time stamp counter instruction) to obtain the number of ticks that represents the number of clock cycles on the CPU since the machine booted. A malware author may use this opcode in the malware to delay execution of its malicious payload without using API or system calls by making requests directly to the CPU from time to time for the number of ticks and waiting for a prescribed incremental increase in the number of ticks before executing. For instance, the malware may (i) request the number of ticks using the opcode, (ii) perform a Sleep or similar operation, (iii) request the number of ticks using the opcode at a later time, and (iv) execute its malicious code if the number of ticks indicates that a sufficient amount of delay has passed (e.g., malware's desired delay has been reached).

(3) API Call Serviced in the User Mode Layer

In this third delay approach, the malware makes an API call that is not transferred to the kernel mode layer but rather is serviced by another mechanism. For example, this API call may be serviced in memory at the Guest user mode layer. One example of an API call that does not require a system call is Get Tick Count. In some embodiments, the malware may pursue an "in memory inspection" approach to achieve the same effect as such API call (e.g., get tick count) by assessing and copying portions of assembly code of the OS used for responding to such API calls into its own malicious code or into the process running the malware.

VI. Example Techniques to Manipulate Time to Cause Malware Activation

In order to address each of the delay approaches described above that are often employed by malware to delay execution of its malicious payload, embodiments of the invention manipulate time to make the malware believe that the malware's desired time delay has been reached. Some embodiments of the invention make use of the different layers in software stack 300 of the MCD system 110$_1$ to create a hybrid technique.

In the first approach for effecting a delay where the malware (or the process in which it is running) makes an API call that is transferred from the user mode layer to the kernel mode layer (e.g., transitioning to the system call), the API call returns when it has been serviced from the kernel to the user mode layer and to the malware. The API call can be intercepted, trapped, or otherwise "hooked" in either the user mode layer or the kernel mode layer by monitoring agent 330 located appropriately, e.g., proximate one or the other of the user mode layer 301 or kernel mode layer 302, respectively. In order to be serviced by the kernel, the API call transitions to a kernel scheduler, e.g., scheduler 306, which is located in the kernel mode layer 303. In an example embodiment, the time-dilation logic 232 corresponding to the monitoring agent 230 that intercepts the API call is located in the hypervisor layer 303. The hypervisor 200 communicates a confirmation back to the kernel mode layer 302 and/or the user mode layer 301 with an altered time seen by the Guest OS. In another embodiment, the time-dilation logic 232 of the time controller 305 running in the hypervisor layer 303 in association with the hypervisor 200 may communicate the confirmation. Alternatively, a time controller 305 included in the virtual chipset 411 (e.g., virtual CPU) modifies the response to a software call (or other time check), and generates an interrupt (e.g., a clock interrupt) that is received by the kernel scheduler 306 of the kernel mode layer 302 to alter the Guest OS time A further understanding of the inventive techniques to address the approaches commonly used by delayed activation malware can be had with reference to the flowcharts of FIGS. 5-8. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5A:
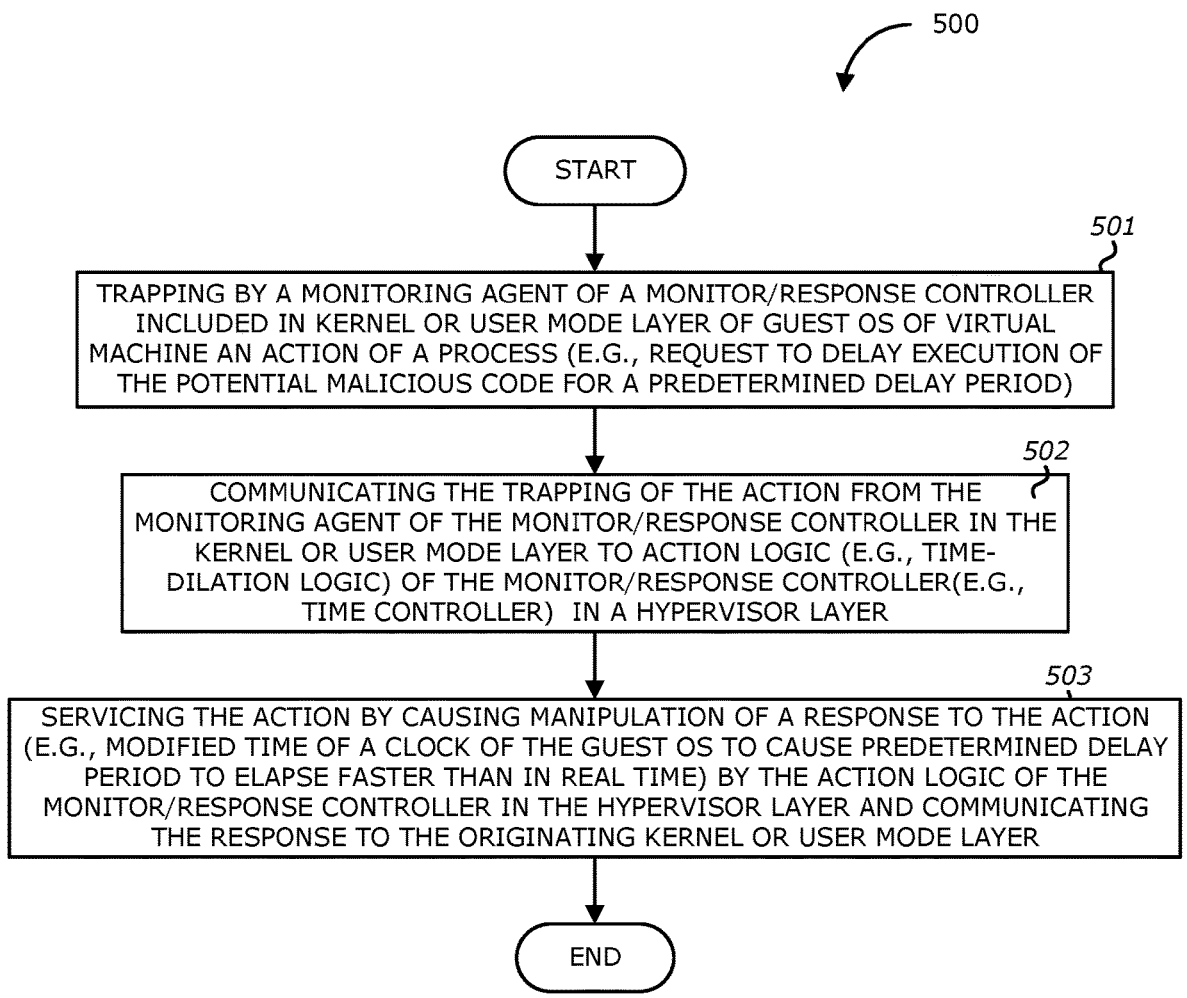
FIGS. 5A and 5B each illustrate a flowchart of an example method performed by a controller detecting a request or other action of a running application and servicing the action at least in part from a different layer of the functional stack of FIG. 3 according to embodiments of the invention.

FIG. 5A illustrates a flowchart of an example method 500 of manipulating time to detect a "time bomb" malware that uses the first delay approach. The method 500 starts with a monitoring agent of a time controller (e.g., a monitoring/response controller) in a guest OS of the VM trapping an action (in this case a system call) of a potential malicious code based on a request to delay completion of its execution for a predetermined time delay (Block 501). The time controller may be implemented in the user mode layer and/or in the kernel mode layer such that the time controller may establish the trap at either layer. For instance, the malware or the process running the malware may cause the user mode layer to initiate an API call (e.g., sleep for 30 minutes), and the monitoring agent may trap the software call. In this embodiment, as discussed above, the API call "sleep" is serviced in the kernel mode layer. Accordingly, a time controller may also establish the trap at the kernel mode layer. At Block 502, the time controller communicates the trap to another layer. In some embodiments, the hypervisor layer also includes an action logic, e.g., time-dilation logic, of the time controller such that the communication occurs from the monitoring agent in the user mode layer or the kernel mode layer to the action logic in the hypervisor layer. This communication may also indicate to the action logic in the hypervisor layer that a manipulation of the time is needed to detect the potential malicious code because the malware may be a "time bomb."

At Block 503, the action logic in the hypervisor layer may manipulate the time of a clock of the guest OS. The manipulated time causes the predetermined delay period to elapse faster than in real time. For example, where the API call is serviced in the kernel mode layer, the action logic of the hypervisor layer may change how the kernel scheduler runs in order to manipulate the time of the clock of the guest OS. For instance, the action logic, using interrupts sent to the kernel scheduler, may generate a time adjustment or may change the clock to cause the kernel scheduler to move forward in time. Accordingly, by altering the time seen by the kernel scheduler, the timing of the whole guest OS is being altered. This may reduce the chance of the malware discovering that time is being manipulated by a malware detection system.

Figure 5B:
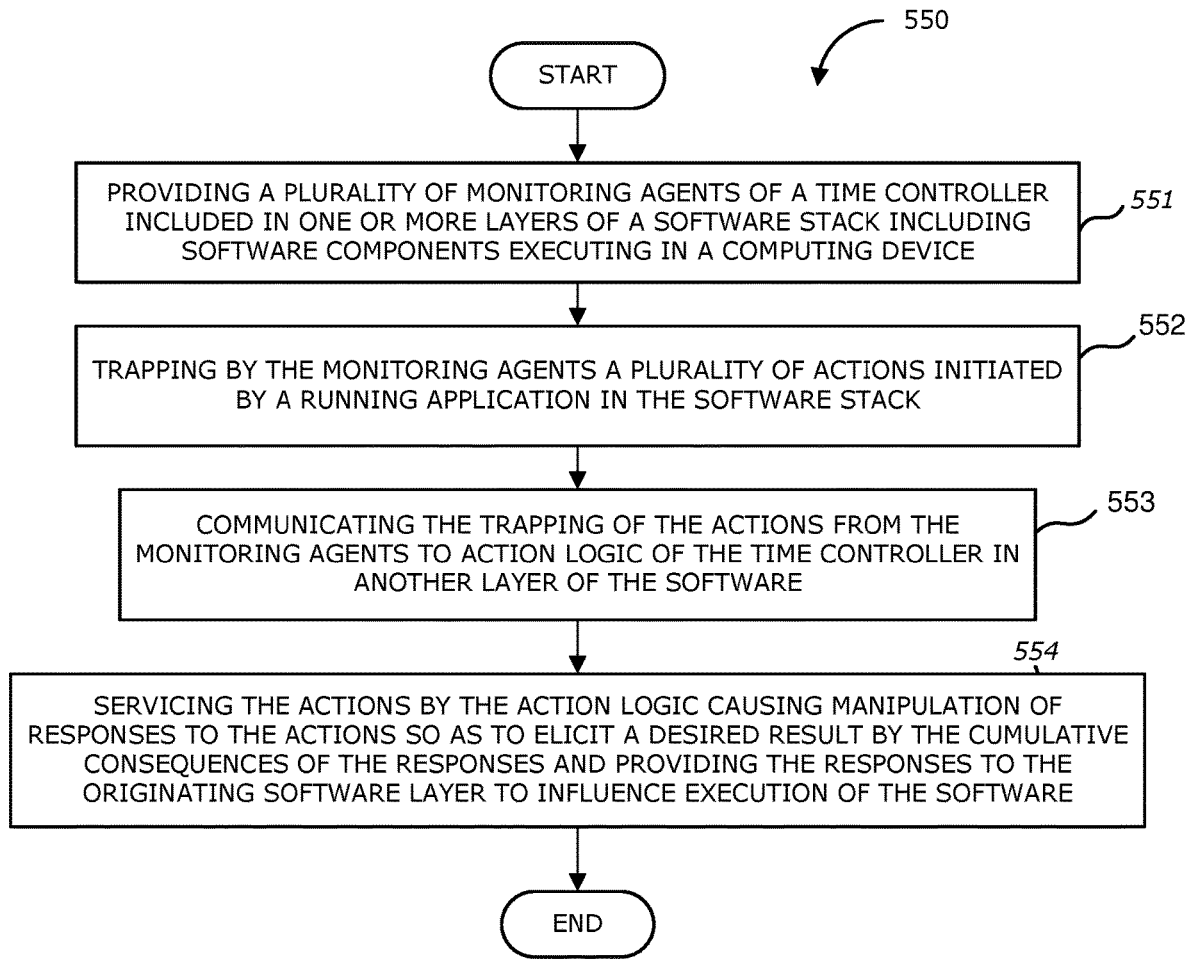

FIG. 5B depicts an example method 550 of servicing trapped actions (e.g., software calls) employing a time controller having plural monitoring agents and a single time-dilation logic. In step 551, the method 550 provides a plurality of monitoring agents of a time controller included in one or more layers of a software stack including software components executing in a computing device. In step 552, the method 550 traps by the monitoring agents a plurality of actions initiated by a running application in the software stack. Then, in step 553, the method 550 communicates the trapping of the actions from the monitoring agents to time-dilation logic of the time controller in another layer of the software. Finally, in step 554, the method 550 services the actions by the time-dilation logic causing manipulation of responses to the actions so as to elicit a desired result by the cumulative consequences (direct and indirect) of the responses and provides the responses to the originating software layer to influence execution of the software.

Figure 4:
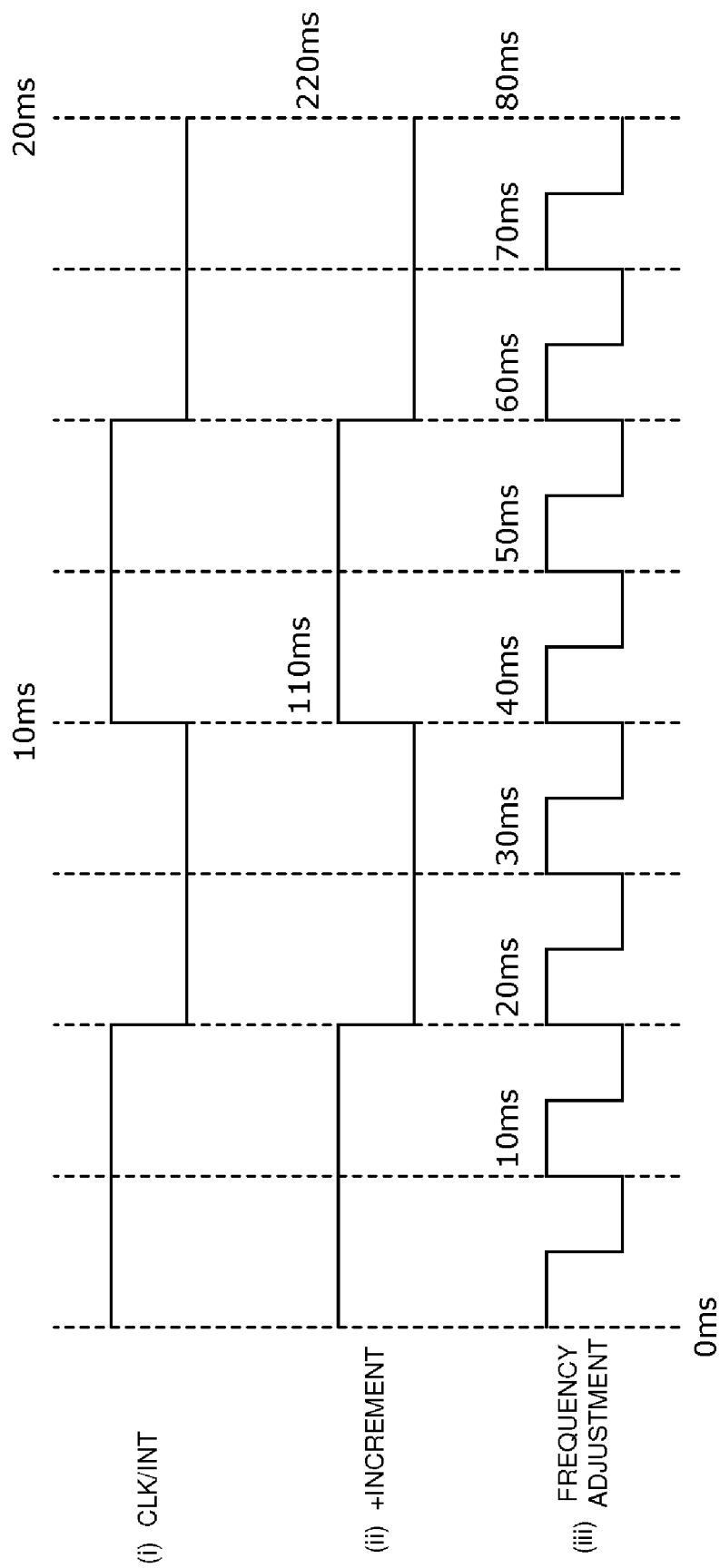
FIG. 4 illustrates the timing diagrams of (i) the real clock of the guest operating system, (ii) the manipulated clock that includes an increment according to one embodiment of the invention, and (iii) the manipulated clock that operates at an increased frequency according to an embodiment of the invention.

In some embodiments, to generate the time adjustment, action logic uses the interrupts to add an increment to each clock cycle or to change the frequency of the clock cycles. FIG. 4 illustrates the timing diagrams of (i) the real clock of the guest OS, (ii) the manipulated clock that includes an increment according to one embodiment of the invention, (iii) the manipulated clock that operates at an increased frequency according to another embodiment of the invention. In FIG. 4, the real clock (i) of the guest OS may be, for example, 10 milliseconds (ms) per ½ clock cycle. In timing diagram (ii), the hypervisor manipulates the clock by adding an increment of, for example, 100 ms to each clock cycle. Accordingly, for each real clock cycle of 10 ms, the manipulated clock indicates 110 ms (i.e., 10 ms+100 ms). In timing diagram (iii), the hypervisor manipulates the clock by increasing the frequency by 4 times. Accordingly, for each real clock cycle of 10 ms, the manipulated clock indicates 40 ms (i.e., 4×10 ms). Using the manipulated clock (ii), when the malware makes a system API call to sleep for 220 ms, the guest OS running on the manipulated clock (ii) will allow for the requested sleep to be completed in 20 ms. Similarly, using the manipulated clock (iii), when the malware makes a system API call to sleep for 80 ms, the guest OS running on the manipulated clock (iii) will allow for the requested sleep to be completed in 20 ms. In other words, the response to the system API call based on the manipulated clock time is returned to the user mode layer and to the malware or process running the malware.

If the malware uses the second approach for effecting delay—where the malware includes opcodes, e.g., for "rdtsc," to obtain directly the number of CPU ticks, and then delay until a prescribed tick count has been reached—embodiments of the invention may employ the virtual chipset to provide a manipulated number of hardware ticks that represents an exaggerate (increase) of the number of clock cycles that have been seen by the CPU. In some embodiments, the virtual clock included in the virtual chipset is provided the same incremental or same frequency change that is provided to the guest OS such that the virtual clock may provide a manipulated number of ticks in response to the opcode "rdtsc".

For this, the rdtsc opcode may be trapped explicitly in some embodiments by a monitoring agent in the hypervisor layer in response to a monitored Sleep or other delay request detected by a monitoring agent located in a higher layer such as the guest user mode process or guest kernel mode layer. In response, time-dilation logic located in the hypervisor layer or the guest kernel layer may provide a false time by moving forward a timestamp counter of the virtual chipset (e.g., the virtual CPU) read by the rdtsc, which false time is then provided as a response to the rdtsc opcode to the malware. In alternative embodiments to those just described, the timestamp counter may be moved forward to provide a false time in response to subsequent rdtsc opcode without the need to trap the rdtsc, in response to a monitored delay in execution of an object or process or a period of predetermined length of inactivity with respect to an object or process being executed.

In another embodiment, rather than generating interrupts from the hypervisor layer or chipset to the kernel scheduler 306 to manipulate the time of the guest OS, an alternate kernel scheduler 307 is included in the kernel layer. The alternate kernel scheduler 307, which may be substantially identical to the kernel scheduler 306, receives the interrupts from the hypervisor layer that cause the alternate kernel scheduler 307 to manipulate the clock time, as discussed above. In this embodiment, when the hypervisor layer receives the communication from the user mode layer or the kernel mode layer that a manipulation of time is desired to trap a "time bomb" malware (Block 502), the hypervisor layer may signal activation of the alternate kernel scheduler in lieu of operation of the otherwise active kernel scheduler for this process (Block 503).

In another embodiment, a hybrid technique may perform a secondary trap on the "time bomb" malware. As discussed above, when the monitoring agent in the user mode layer or the kernel mode layer identifies a suspicious content that is trying to delay (e.g., for three hours) execution of its malicious code (Block 501), the monitoring agent communicates the trap to the hypervisor layer (Block 502). In this embodiment at Block 503, the hypervisor may cause the virtualized chipset to generate a hibernation to bring the system "down" and communicate that a hibernation (equal to the delay) is set. However, once the system is in hibernation, the action logic may alter the clock to move time forward (e.g., change the time to reflect a three-hour advance in time when only five seconds have passed). The hypervisor may signal to the virtual chipset to alter the number of hardware ticks in the virtual chipset to reflect a manipulated time (e.g., moving time forward by increasing the number of hardware ticks). In this embodiment, the virtual machine $210_1$ may leverage some of the non-interrupt chipset capabilities to virtualize the hibernate (or sleep) and assess how the guest OS handles the resumption of processing (resume) after the hibernation and the adjustment of the clock. The virtual machine $210_1$ may thus, leverage built-in OS features to alter time in such a way that time is moving forward convincingly to the malware.

In this embodiment, in the event that the malware performs a subsequent check to determine if the hibernation was in fact three hour in duration and not a manipulated time that was effectuated to trap its malicious code, the action logic may identify the potential malware as a time bomb based on the malware's API call for a delay in execution of its code in conjunction with the subsequent checks being performed by the potential malware that regarding the delay.

Figure 6:
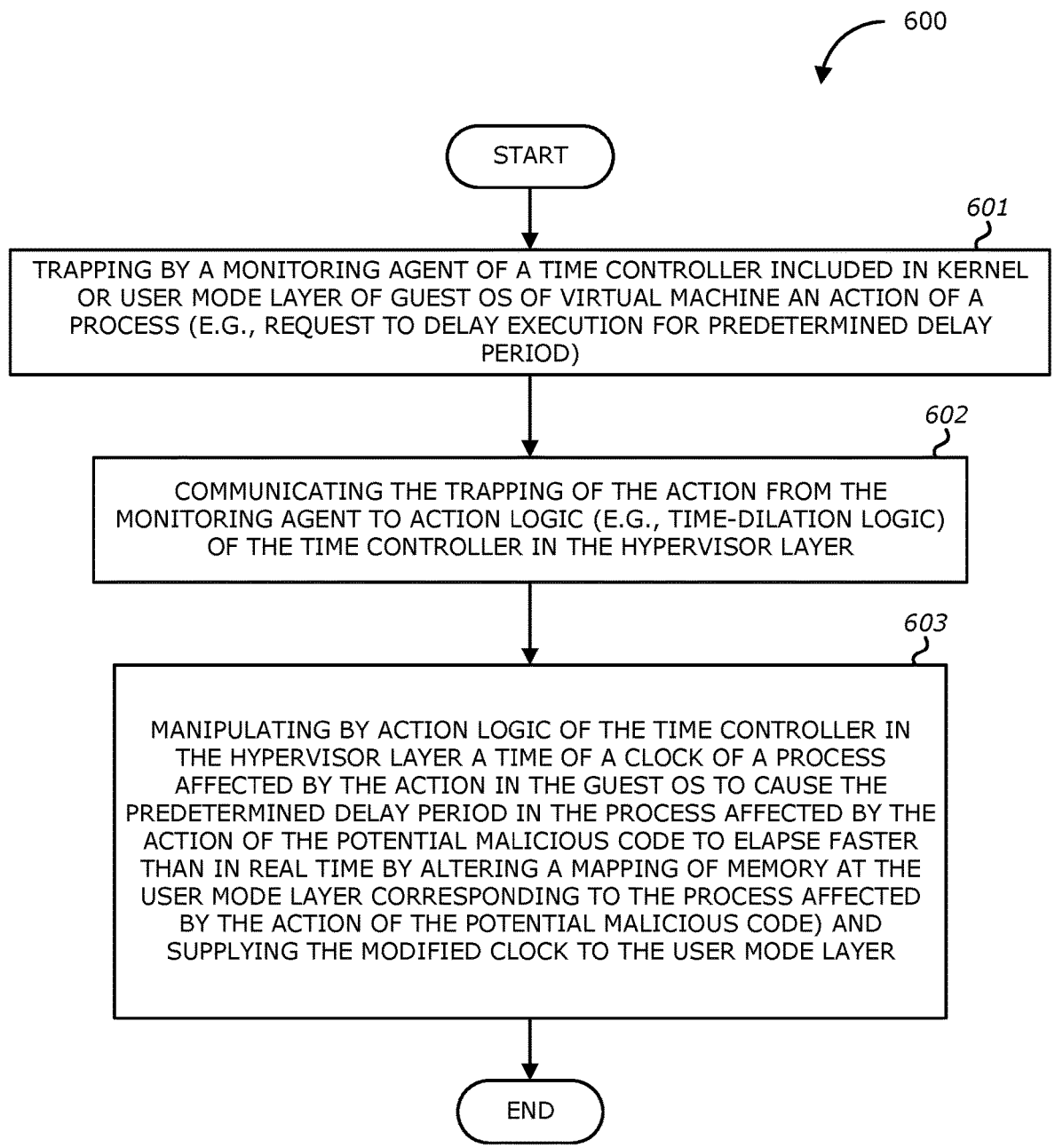
FIG. 6 illustrates a flowchart of example method that employs memory mapping to provide a manipulated response in accordance with an embodiment of the invention.

FIG. 6 illustrates a flowchart of an example method 600 of detecting a "time bomb" malware by manipulating time according to another embodiment of the invention. Specifically, FIG. 6. illustrates one embodiment of the invention that manipulates time by changing the mapping of the memory to address the third malware approach for effecting a delay where the malware makes an API call that is not transferred to the kernel mode layer, but rather is serviced in memory at the user mode layer. Referring to FIG. 6, it is noted that in this scenario where an API call is sent from the malware that is serviced in memory at the user mode layer, a monitoring agent of the time controller may trap the action of a potential malicious code at the user mode layer (Block 601) and communicate to the hypervisor layer that the manipulation of time is needed from the user mode layer (Block 602). For instance, the API call, such as "get tick count" is serviced in memory at the user mode layer. However, the memory at the user mode layer is mapped by the kernel for every process to a physical area of memory. When the kernel scheduler updates time based on interrupts received, the kernel scheduler calls to the virtualized chipset to obtain the clock ticks and the kernel updates the memory structures in the physical area of memory to reflect this updated time for each process. Accordingly, since the memory at the user mode layer is virtual memory and it is mapped to a physical memory location, in one embodiment, at Block 603, the virtual machine $210_1$ alters the mapping of the different physical memory locations on a per process basis. The virtual machine $210_1$ may change the mapping of the manipulated time's memory sections for the processes affected by the action of the potential malware. This embodiment allows for a process level speed-up and does not require a time manipulation for the entire guest OS. In one embodiment, the virtual machine $210_1$ may include the action logic in the hypervisor layer. As shown in Block 603, the action logic in this embodiment may perform the manipulation of the time of the clock of the process affected by the action of the potential malicious code in the guest OS to cause the predetermined delay period in the process affected by the action of the potential malicious code to elapse faster than in real time. As discussed above, the manipulation of the time of the clock of the process affected by the action of the potential malware may include altering a mapping of memory at the user mode layer corresponding to the process affected by the action of the potential malware.

While the time controller may be triggered to trap the malware and manipulate time by malware behavior (or lack of behavior) within the VM as discussed above (e.g., API calls such as "to sleep", memory changes such as "Get tick count", CPU opcodes such as "rdtsc", etc.), the time controller may also be triggered by means that are external to the VM. For instance, the detector logic in the MCD system $110_1$ may detect "time bomb" malware based on assessing a sequence or group of events and determining that this sequence or group of events is seeking to modify time. For instance, rules applied on the dynamic sequence or group of events may cause the detector logic to enable the time controller to trap the malware and manipulate time while the specimen is running. Accordingly, the time controller may perform one or more methods to manipulate the time to cause the specimen to see a shorter time period than the actual time elapsed or may cause the specimen to run at a future date. In another example, the MCD system $110_1$ may process a specimen simultaneously or in parallel (in a temporally overlapping manner) in VMs with multiple guest profiles and with different time controller configurations: (i) a first profile may be configured with specified monitoring agents completely disabled or partially disabled and (ii) a second profile may be configured with the monitoring agent enabled. Using the parallel specimen submissions, the MCD system $110_1$ may create a dynamic learning system for human analysis or for machine learning. The MCD system $110_1$ as well as the time controller may thus learn the malware's time bomb behavior and assess the best methods to manipulate time in other (future) MCD analysis to thwart the malware's "time bomb" attack.

Figure 7:
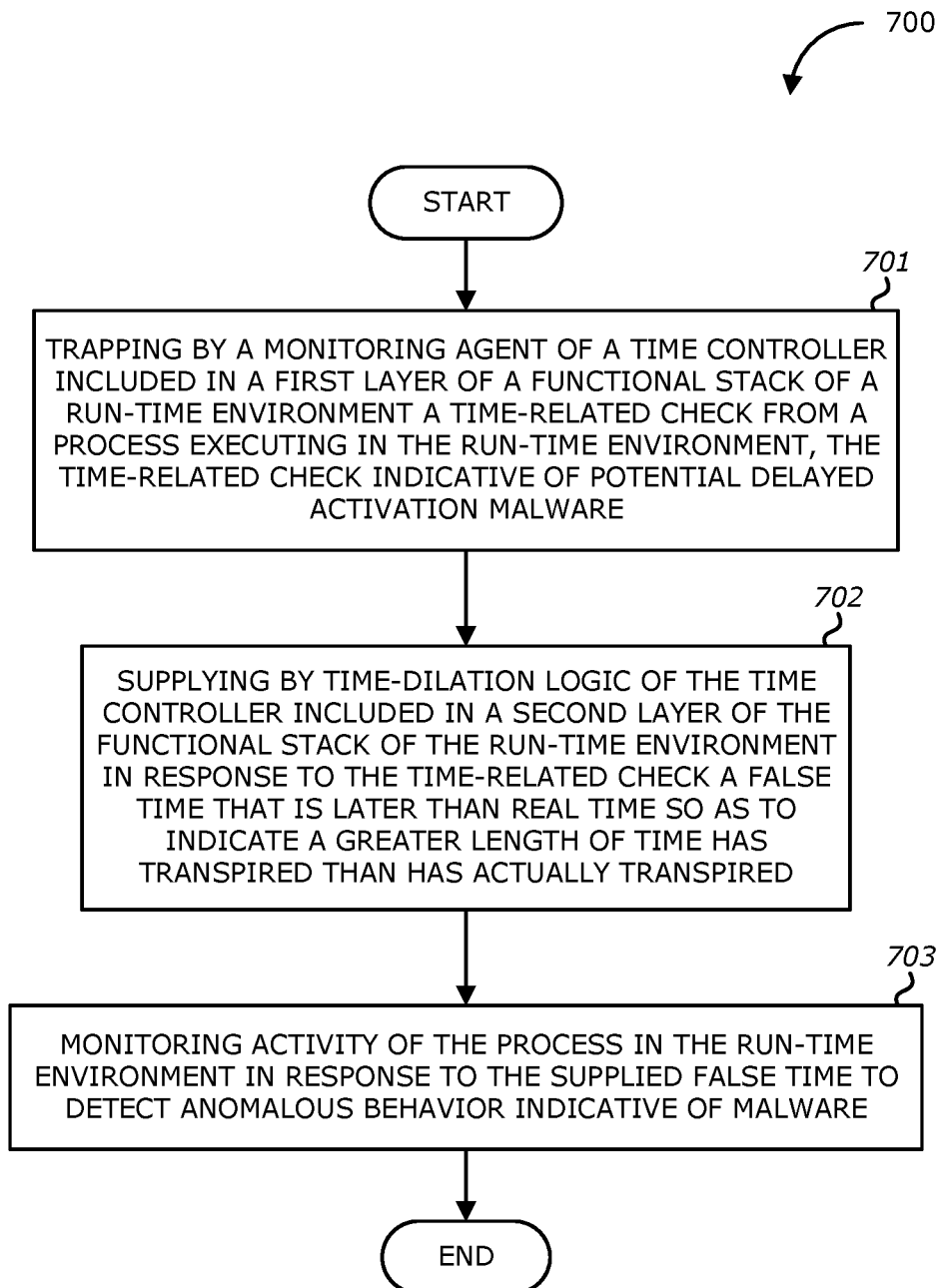
FIG. 7 illustrates a flowchart of an example of a method that relates to manipulating experiential time within a runtime environment for detecting malware according to one embodiment of the invention, where the monitoring agent and time-dilation logic of a time controller are located in different layers of a functional stack of software components executing with the run-time environment.

FIG. 7 illustrates a flowchart of another example method 700 of detecting delayed activation malware involving manipulating time according to one embodiment of the invention. The method 700 starts at Block 701 with a monitoring agent of a time controller included in a first layer of a functional stack of a run-time environment trapping a time-related check from a process executing in the run-time environment to process a specimen. The time-related check may be indicative of potential delayed activation malware. In some embodiments, the trapping of the time-related check in Block 701 includes intercepting a software call from the process to obtain current time, and communicating information regarding the trapped software call to the time-dilation logic of the time controller. The software call may be directed to an executing software module in a third layer in the functional stack of the run-time environment that is different from the first layer. In some embodiment, the first layer is the kernel mode layer of a guest OS of a virtual machine, and the second layer is a hypervisor layer. For instance, the software call may include a system call and the executing software module may include an operating system. In one embodiment, the executing software module includes the hypervisor. The run-time environment may include a virtual environment provisioned with a guest software image comprising the process and the operating system.

At Block 702, a time-dilation logic of the time controller included in a second layer of the functional stack of the run-time environment supplies in response to the time-related check a false time that is later than real time so as to indicate a greater length of time has transpired than has actually transpired.

At Block 703, the monitoring agent monitors activity of the process in the run-time environment in response to the supplied false time to detect anomalous behavior indicative of malware In some embodiments, the time-dilation logic of the time controller may also manipulate real time to generate the false time and cause a predetermined period of time of execution of the process to elapse faster than in real time.

In one embodiment, the monitoring agent in the kernel mode layer communicates the trapping of the time-related check from to the time-dilation logic located at least in part in a hypervisor layer of the virtual machine, and the time-dilation logic manipulates a time of a clock of the guest OS to yield the false time, and cause a predetermined delay period in the guest OS to elapse faster than in real time. In this embodiment, the manipulating of the time of the clock of the guest OS includes altering an interrupt sent to a kernel scheduler included in the kernel mode layer and to cause the kernel scheduler to initiate processing of the specimen within a desired period of time. As discussed in the embodiments above, the altered interrupt transmitted to the kernel scheduler may cause the kernel scheduler to advance the time of the clock of the guest OS to reflect the false time. For instance, the altered interrupt may cause the kernel scheduler to perform at least one of: increase a frequency of the clock of the guest OS, and increment the clock of the guest OS with a value greater than that normally added thereto. In one embodiment, the kernel scheduler may include a first scheduler and an alternate scheduler, and the kernel scheduler initiates processing of the specimen within the desired period of time using the alternate kernel scheduler included in the kernel mode layer to schedule processing of the specimen. In this embodiment, to manipulate the time of the clock in the guest OS, the time-dilation logic of the time controller may also include partially or completely disable the first kernel scheduler, and enable the alternate scheduler. In another embodiment, the altered interrupt transmitted to the alternate kernel scheduler causes the alternate kernel scheduler to advance the time of the clock of the guest OS to reflect the false time.

In one embodiment, the monitoring agent may trap the time check by trapping an API call that is serviced in the kernel mode layer. In another embodiment, the monitoring agent may trap the time check that comprises a CPU query of a system clock. In this embodiment, the monitoring agent may supply the false time by executing an opcode requesting a number of hardware ticks, reflecting the system clock in an operating system clock, and providing the false time based on the operating system clock in response to the CPU query.

The controller may also direct the CPU query to a virtual CPU of a virtual machine executing in the user mode level of the run-time environment. In this embodiment, providing the false time by the time-dilation logic comprises directing the response to an executing software module in the user mode level. The time-dilation logic may also supply the false time by advancing a "virtual" system clock maintained by a virtual chipset by a number of ticks, and generating the false time based on the system clock.

In another embodiment, the monitor agent traps the time-related check by trapping a memory access corresponding to a time query made to a first memory location corresponding to the process, and the time-dilation logic supplying the false time by altering a mapping of memory at the user mode layer corresponding to the process so as to provide in response to the memory access, contents from a second memory location. The first memory location may include contents that reflect the real time and the second memory location contents may reflect the false time.

According to one embodiment, the memory at the user mode layer is virtual and mapped by a kernel mode layer for every process to a physical area of memory included in a physical layer. In this example, the monitor agent trapping a memory access corresponding to a time query includes trapping an API call that is capable of being serviced in memory at the user mode layer.

VII. Embodiments of Time Controllers

Figure 9A:
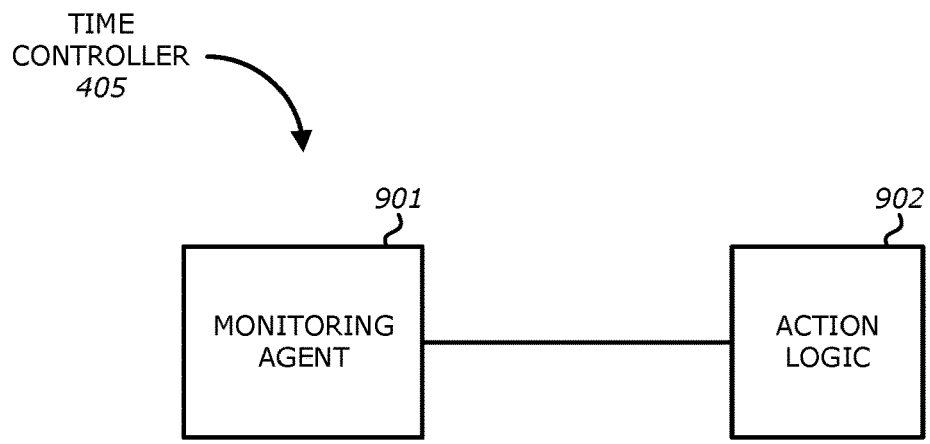
FIG. 9A and FIG. 9B show example block diagrams that illustrate components of a time controller according to embodiments of the invention.
Figure 9B:
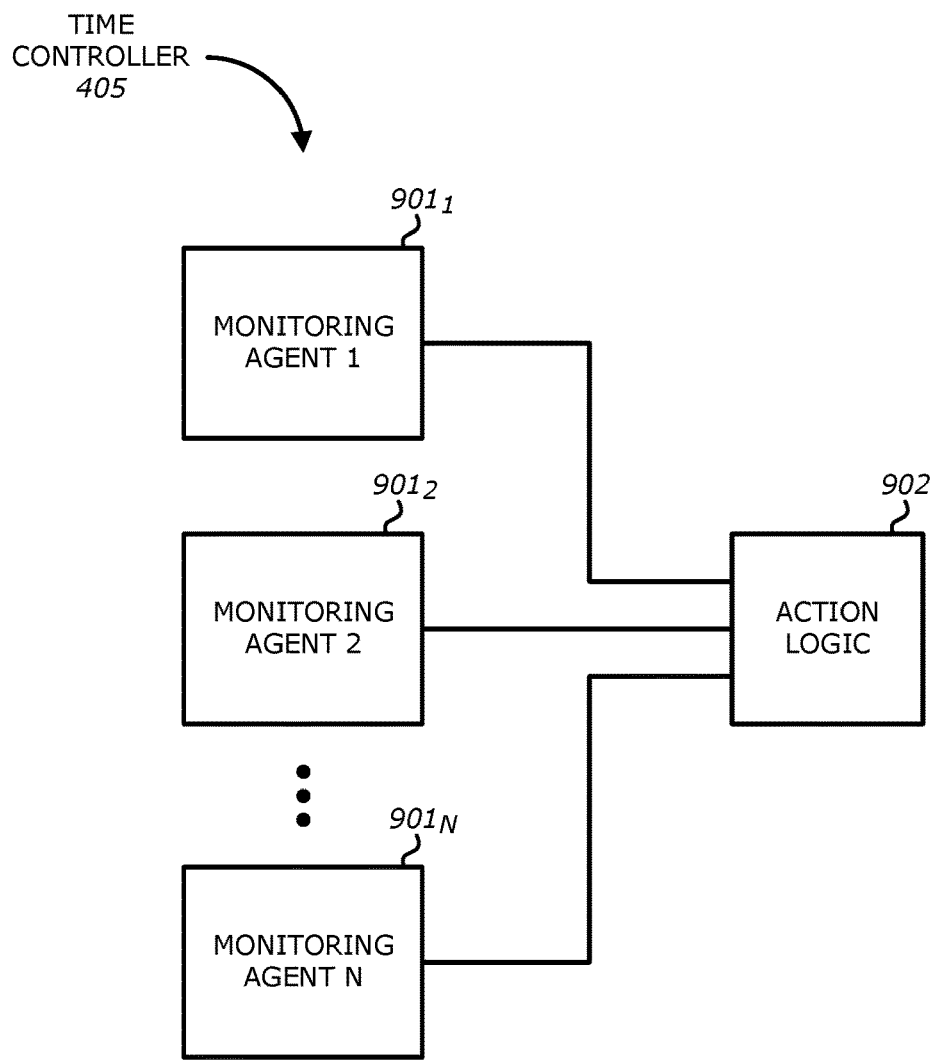

FIG. 9A and FIG. 9B show example block diagrams that illustrate alternative example embodiments of the time controller 305. In FIG. 9A, the time controller 305 includes monitoring agent 901 and action logic 902 (such as, for example, the above-described time-dilation logic) that are communicatively coupled. As shown in FIG. 9B, the time controller 305 may also include a plurality of monitoring agent $901_1$-$901_n$ (n>1) that are each communicatively coupled to the action logic 902.

Each monitoring agent $901_1$-$901_n$ and action logic 902 of a time controller 305 may reside inside or be operative in association with one of the following: (i) the guest image (e.g., the specimen or process running in the user space or kernel space of the guest image), (ii) the host OS software, (iii) the hypervisor, or (iv) a virtualized device of the VM. Alternatively, monitoring agent 901 in FIG. 9A or $901_1$-$901_n$ in FIG. 9B and action logic 902 in FIG. 9A or FIG. 9B may be implemented as an independent process in or operative in association with the guest image or on the host OS. The monitoring agent 901 in FIG. 9A or $901_1$-$901_n$ in FIG. 9B may be located within or be operative in association with any of (i) the guest image, (ii) the host OS software, (iii) the hypervisor, or (iv) a virtualized device of the VM, and the action logic may be co-located (same layer) or may be located in another of these layers, e.g., the monitoring agent may be located closer to the specimen being processed. For example, the monitoring agent may be located within a process (or as a process) of the guest image and the action logic may be in communication with the monitoring agent and operating within the hypervisor. Accordingly, depending on the location of the time controller(s), kernel mode or user mode activities of the guest image may each see a different clock/time or they may all see the same clock/time.

Each time controller can be referred to as an "elastic" time controller since its action logic may be configured to establish "short" or "long" delays. In other words, the action logic of a time controller can respond to a software call from a specimen being processed with a response containing a selected "false" time that induces the specimen into believing it has been dormant or inactive for a shorter period of time or a longer period of time depending on detection needs.

The action logic 902 can decide on the length of delay based on prior analysis results, metadata regarding the specimen, identity of processes running in the run-time environment, experiential knowledge in dealing with known malware, current analysis parameters such as length of the queue of specimens awaiting analysis and contention for resources (e.g., CPU or memory resources), and other factors. The duration of the delay may be a prescribed (fixed) or selectable value. For example, the action logic may select a delay value from any of various discrete lengths of time (e.g., a 30 minute length, 60 minute length, or two day length) or may select any delay value over a continuous range of available time delays (e.g., 60 minutes to 2 days) and so be fully tunable. The action logic 902 then adds the delay value to the current time indicated by the clock it receives or utilizes, so as to fashion a new, "false" current time for replying to the time request/check from the specimen. Future time requests/checks received while processing the same specimen will take into account the delay introduced during the first response so as to provide a consistent clock and avoid malware from detecting that it is being analyzed. In some embodiments, the length of delay (increment) may be parameterized and a configuration file may provide values for such time ranges and periods, and be updated, for example, by downloading replacement or modifications to the configuration file from a central source.

In one embodiment, an exploit detection system (or MCD system $110_1$) may be described as comprising a run-time environment, a behavior controller (e.g., time controller 305) and an analyzer (e.g., behavioral analysis engine 190). The run-time environment that is configurable to execute executable computer program components may process a specimen. As illustrated in FIGS. 9A and 9B, the behavior controller (or time controller 305) that operates with the run-time environment may include an action logic 902 and a monitoring agent 901 or $901_1$-$901_n$. The monitoring agent monitors activities within a first of the executable computer program components, generates monitor results based on the monitored activities and communicates the monitor results to the action logic located at least in part in a second of the executable computer program components. The action logic provides a specious response to a third of the executable computer program components so as to influence processing of the specimen. In one embodiment, the first and second of the executable computer program components are a single one of the executable computer program components.

The analyzer receives the monitor results from the monitoring agent and detects an exploit, if the monitor results indicate that there is an exploit. In another embodiment, the analyzer is further configured to capture and report indicators of compromise including the monitor results associated with the detected exploit.

According to one embodiment, the exploit detection system may also include a virtual machine, a hypervisor to manage the virtual machine, and a host operating system over which the virtual machine and hypervisor execute. The virtual machine may run a guest application in which the specimen is processed, and a guest operating system over which the application executes. In this embodiment, the virtual machine, guest application, guest operating system, hypervisor, and host operating system comprise the executable computer program components.

In one embodiment, the run-time environment further processes the specimen responsive to a configurable run-time parameter and the action logic configures the run-time parameter so as to influence processing of the specimen in response to the monitoring results. The action logic may be responsive to a stored action plan that includes a plurality of rules identifying values for run-time parameters to be provided by the action logic to the run-time environment in response to a plurality of different pre-determined sets of potential monitor results.

Additionally, in one embodiment, the MCD $110_1$ may include a primary controller with configuration, policy, and management logic situated in one or more of these multiple layers and adapted to communicate with and configure (e.g., provide the rules, policies, and otherwise manage) each of the time controllers. The primary controller may selectively enable/disable one or more of the time controllers to monitor and/or respond to the software calls or other time checks, employing one or more of the techniques mentioned herein. Individual time controllers may be entirely enabled or disabled, or partially enabled or disabled. Partial enablement may denote that the time controller is limited in operation, for example, to introduce only a prescribed and fixed delay time, e.g., a short delay of fixed duration, or to provide time dilation regardless of any observed behaviors of a particular specimen.

The primary controller may be implemented as part of a VM monitor or manager (VMM), also referred to as a hypervisor, which manages or monitors VMs, or, in some embodiments, may be integrated functionally into one of the time controllers. In one embodiment, the MCD may be equipped with the primary controller, e.g., as part of the VMM, when the MCD is deployed, which enables or disables a specific time controller (or specific monitoring agent or action logic) instantiated with a corresponding virtual machine based on detection requirements.

FIG. 10 illustrates an example block diagram that illustrates an embodiment of a primary controller 420 coupled with a plurality of time controllers of FIG. 3 so as to control their operation, according to one embodiment of the invention. More specifically, according to this embodiment, rather than each time controller 305 operable independently of any other one, as described in the previous embodiments, a plurality of time controllers $305_1$-$305_m$ (m>1) may be used in such manner that they are controlled and operative in a coordinated manner. Though not shown in FIG. 10, it can be readily understood that each of the time controllers $305_1$-$305_m$ may include one or more monitoring agents 901 or $901_1$-$901_n$ and an action logic 902 as illustrated in FIGS. 9A and 9B. In some embodiments, at least two different time controllers $305_1$, $305_2$ may share a single action logic 902. In these embodiments, each of the time controllers $305_1$, $305_2$ have separate monitoring agent 901 in the same or different layers of the software stack that are respectively communicatively coupled with the single action logic 901 that may be co-located with a monitoring agent in the same layer or in a different layer. The monitor agent and action logic of the time controllers may operate in association with the application, the operating system, the host operating system software, the hypervisor, or a virtualized device. The monitor agent and the action logic of a given time controller may respectively operate in association with the same or a different one of: the application, the operating system, the host operating system software, the hypervisor, or a virtualized device.

In one embodiment, the MCD system to detect delayed activation malware includes a plurality of time controllers $305_1$-$305_m$ including a first time controller $305_1$ and a second time controller $305_2$. The MCD system also includes a run-time environment to be executed by a processor, and that includes an application to process one or more specimens. The one or more specimens may or may not include delayed activation malware. The run-time environment also includes an operating system in communication with the application, and a plurality of monitors including the monitoring agents of the first time controller $305_1$ and second time controller $305_2$, respectively. The monitoring agents are configured so as to be operable in association with different components of the run-time environment to trap, directly or indirectly, a time-related check of the run-time environment observed from the associated component. The action logic of the first and second time controllers $305_1$, $305_2$ respond to the time-related check with a false time that is later than real time so as to indicate a greater length of time has transpired than has actually transpired. During execution, the application processes the one or more specimens based at least in part on the false time and the monitoring agents of the run-time environment monitor activity of the application during execution to detect whether the delayed activation malware is included in the one or more specimens. The monitoring agents may thus assess whether anomalous activity is associated with the malware.

In one embodiment, the monitoring agent of the first time controller $305_1$ operates in association with a first component of the run-time environment comprising the application while the monitoring agent of the second time controller $305_2$ operates in association with a second component of the run time environment comprising the operating system. Accordingly, the MCD system may trap time checks originating from the application and the operating system, respectively. The application may use a clock reflecting the false time, and the operating system may use a clock reflecting the real time. In one embodiment, the application and the operating system may reside in the guest memory space and use a clock reflecting the false time while the host operating system accesses and uses a clock reflecting the real time.

The run-time environment may comprise a virtual run-time environment that includes a hypervisor, and at least one virtual machine in communication with the hypervisor. In one embodiment, the monitoring agent of the first time controller $305_1$ operates in association with a third component of the run-time environment that includes either the application or the operating system while the monitoring agent of the second time controller $305_2$ operates in association with a fourth component of the run time environment that includes the hypervisor. According, this embodiment of the MCD 101 is able to trap time checks originating from the third component and the fourth component, respectively.

In another embodiment, the run-time environment also includes a host operating system. The monitoring agent of the first time controller $305_1$ in this embodiment operates in a guest memory space of the host operating system while the monitoring agent of the second time controller $305_2$ operates in association with a kernel memory space of the host operating system.

In one embodiment, the action logic 902 of each of the first and second time controllers $305_1$, $305_2$ provides a false time in response to a software call from the application comprising the time-related check. In another embodiment, the action logic 902 of each of the first and second time controllers $305_1$, $305_2$ determines a delay period for purposes of time dilation to be used in generating the false time.

Referring back to FIG. 10, any one of the time controllers $305_1$-$305_m$ may be used as a primary controller (e.g., $305_m$). The primary controller $305_m$ communicates with the first and second time controllers $305_1$, $305_2$ and selectively enables and disables the first and second time controllers $305_1$, $305_2$ so as to provide a corresponding time dilation action reflected in the false time. For instance, when the first time controller $305_1$ is enabled, the action logic of the first controller $305_1$ may respond to the time check from the run-time environment. In this embodiment, the run-time environment may include a hypervisor, which comprises the primary controller.

The primary controller $305_m$ may be configured to enable both the first and second time controllers $305_1$, $305_2$. In this embodiment, the action logic of the first and second time controllers $305_1$, $305_2$ are configured to provide time dilation action when enabled such that the false time reflects both the time dilation actions of the first and second time controllers $305_1$, $305_2$.

When the action logic of the first and second time controllers $305_1$, $305_2$ determine a delay period to be used in generating the false time, the primary controller $305_m$ configures the first and second time controllers $305_1$, $305_2$ with runtime rules for the first and second time controllers $305_1$, $305_2$ to use in determining the delay period. The run-time rules may be pre-set or dynamically determined during run-time based on one or more factors including history of activation delays of known delayed activation malware.

The primary controller $305_m$ generates and stores in a memory of the MCD an action plan for exercising the one or more specimens so as to trigger activity of malware that may be included therein. The primary controller $305_m$ may also configure the first and second time controllers $305_1$, $305_2$ to execute the action plan that specifies an identifier of each of the time controllers $305_1$, $305_2$ to be enabled, and specific delay values to be reflected in the false time to cause the application to execute within a desired period of time.

Figure 8:
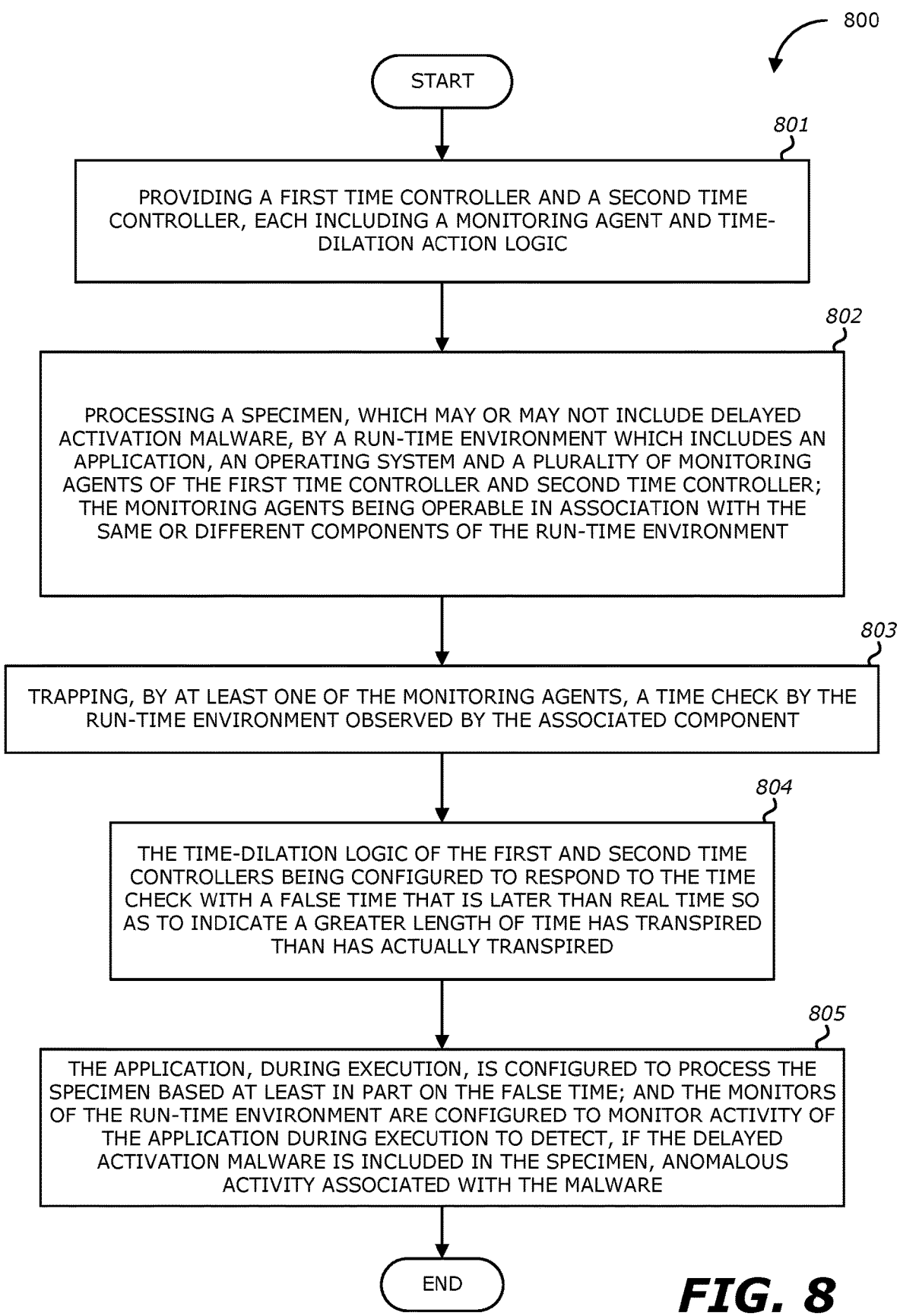
FIG. 8 illustrates a flowchart of another example method of detecting delayed activation malware according to one embodiment of the invention.

FIG. 8 illustrates a flowchart of another example method of detecting delayed activation malware according to one embodiment of the invention. The method 800 starts with a first time controller and a second time controller being provided. Each of the first and second time controllers including a monitoring agent, and action logic in communication with the monitoring agent (Block 801). At Block 802, a run-time environment processes a specimen. The specimen may or may not include the delayed activation malware. The run-time environment established by a processor includes an application, an operating system in communication with the application, and a plurality of monitors including the monitoring agents of the first time controller and second time controller. The application and the operating system may be included as components of the run-time environment. The monitoring agents are configured to operate in association with a different one of the components of the run-time environment. At Block 803, at least one of the monitoring agents trap a time-related check by the run-time environment observed by the associated component. At Block 804, the action logic of the first and second time controllers respond to the time-related check with a false time that is later than real time so as to indicate a greater length of time has transpired than has actually transpired. At Block 805, during execution, the application processes the specimen based at least in part on the false time and the monitors (or monitor agents) of the run-time environment monitor activity of the application during execution to detect, if the delayed activation malware is included in the specimen, anomalous activity associated with the malware.

In one embodiment, the trapping of a time-related check in Block 803 may include trapping time checks originating from the application and the operating system by operating the monitoring agent of the first time controller in association with the application, and operating the monitoring agent of the second time controller in association with the operating system. In another embodiment, the trapping of a time-related check in Block 803 may include trapping time checks originating from a first component and a second component of the run-time environment by operating the monitoring agent of the first time controller in association with the first component comprising one of the application and the operating system, and operating the monitoring agent of the second time controller in association with the second component comprising the hypervisor.

In one embodiment, the application may use a clock reflecting the false time while the operating system may use a clock reflecting the real time. In another embodiment, the application and the operating system may use a clock reflecting the false time while the host operating system uses a clock reflecting the real time.

In one embodiment, an exploit detection system (or MCD system $110_1$) may be described as comprising a run-time environment, a plurality of behavior controllers (e.g., time controllers $305_1$-$305_m$ as shown in FIG. 10) including a primary controller $305_m$, and an analyzer (e.g., behavioral analysis engine 190). The run-time environment that is configurable to execute executable computer program components may process a specimen. As illustrated in FIGS. 9A and 9B, each of the behavior controllers (or time controllers $305_1$-$305_m$) that operate within the run-time environment may include an action logic 902 and at least one monitoring agent 901 or $901_1$-$901_n$. Each of the monitoring agents included in a behavior controller monitor activities within a corresponding executable component. The monitoring agents 901 generate monitor results based on the monitored activities and communicate the monitor results to the associated action logic 902. The action logic 902 of the behavior controllers may enable or disable the associated monitoring agent in response to the monitor results. In one embodiment, the primary controller $305_m$ communicates with the other behavior controllers and selectively causes the time-dilation logic to enable or disable the behavior controllers in accordance with an action plan reflecting the monitor results. The analyzer receives the monitor results from the monitoring agents and detects an exploit associated with the monitor results. The analyzer may also capture and report indicators of compromise including the monitor results associated with the detected exploit.

In one embodiment, the executable computer program components include a virtual machine, a hypervisor configured to manage the virtual machine, and a host operating system over which the virtual machine and hypervisor execute. The virtual machine runs a guest application in which the specimen is processed and a guest operating system over which the application executes. In one embodiment, the virtual machine, guest application, guest operating system, hypervisor, and host operating system comprise the executable computer program components.

In one embodiment, the run-time environment processes the specimen responsive to a configurable run-time parameter, and the time-dilation logic of the behavior controllers configures the run-time parameter so as to influence processing of the specimen in response to the monitoring results. The action plan may include a plurality of rules identifying which of the monitoring agents are to be enabled or disabled, and values for run-time parameters to be provided by the time-dilation logic to the run-time environment in response to a plurality of different pre-determined sets of potential monitor results.

In one embodiment, the primary controller $305_m$ comprises the action logic of at least one of the behavior controllers. In other words, the behavior controllers include the monitoring agent 901 but the action logic 902 that is coupled to the behavior controllers' monitoring agent 901 is included in the primary controller $305_m$. In another embodiment, each of the monitoring agents monitors activities within a corresponding first of the executable components that is different from the executable component corresponding to another of the monitoring agents.

Figure 11:
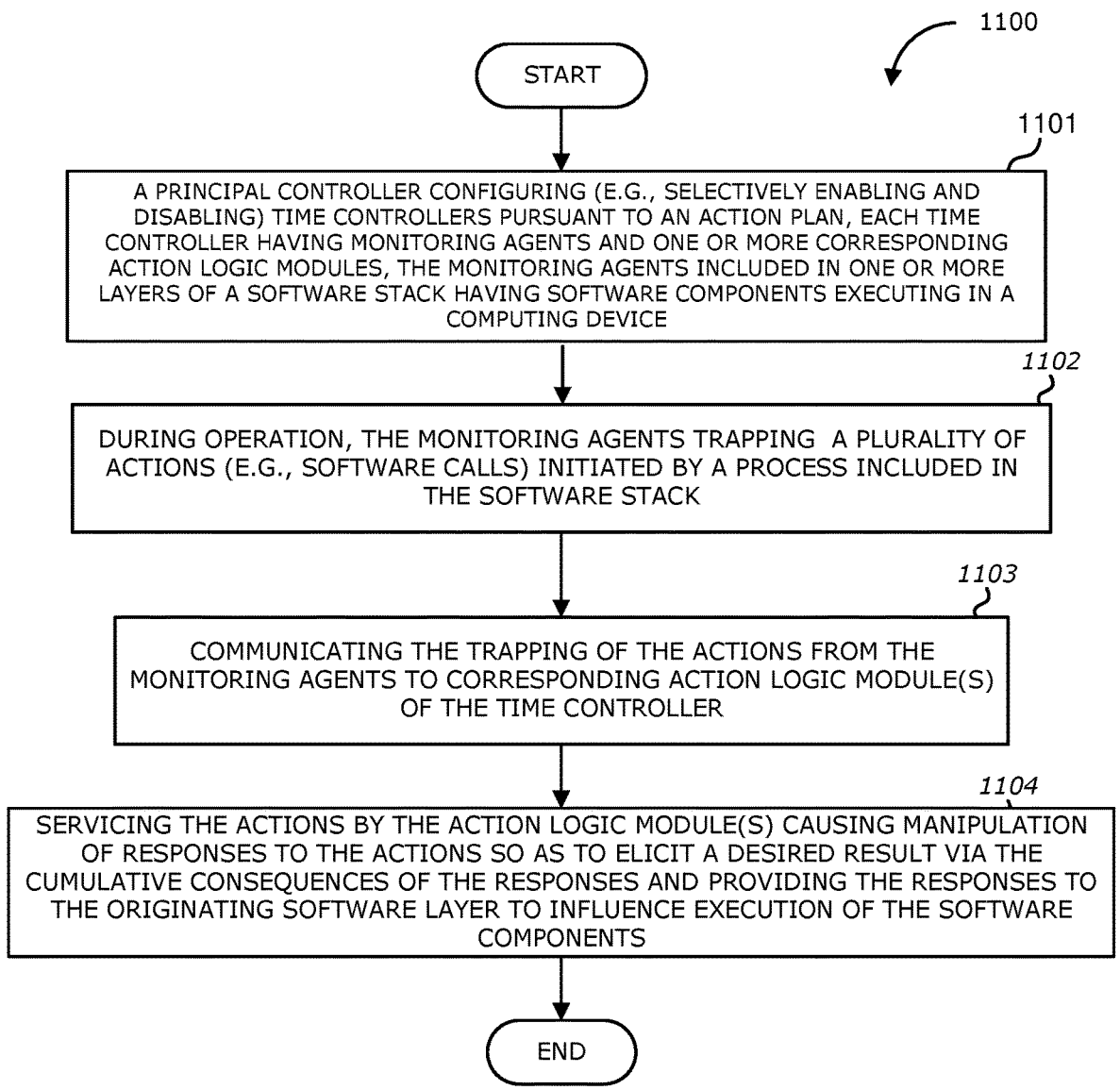
FIG. 11 a flowchart of an example method of detecting delayed activation malware employing the primary controller of FIG. 10 according to one embodiment of the invention.

FIG. 11 depicts a method 1100 of servicing trapped actions (e.g., software calls) employing a primary controller and a plurality of time controllers. In step $110_1$, the method 1100 starts with a primary controller configuring (e.g., selectively enabling and disabling) a plurality of time controllers, the time controllers having a first plurality of monitoring agents of a second plurality of corresponding action logic modules, the monitoring agents included in one or more layers of a software stack having software components executing in a computing device. In step 1102, the method 1100 traps actions (e.g., software calls) initiated by a process included in the software stack. In step 1103, the method 1100 communicates the trapping of the actions from the monitoring agents to corresponding action logic modules of the time controller. In step 1104, the method 1100 services the actions via the action logic modules causing manipulation of responses to the actions so as to elicit a desired result by the cumulative consequences (direct and indirect) of the responses and then the method 1100 provides the responses to the originating software layer to influence execution of the software components.

Figure 12:
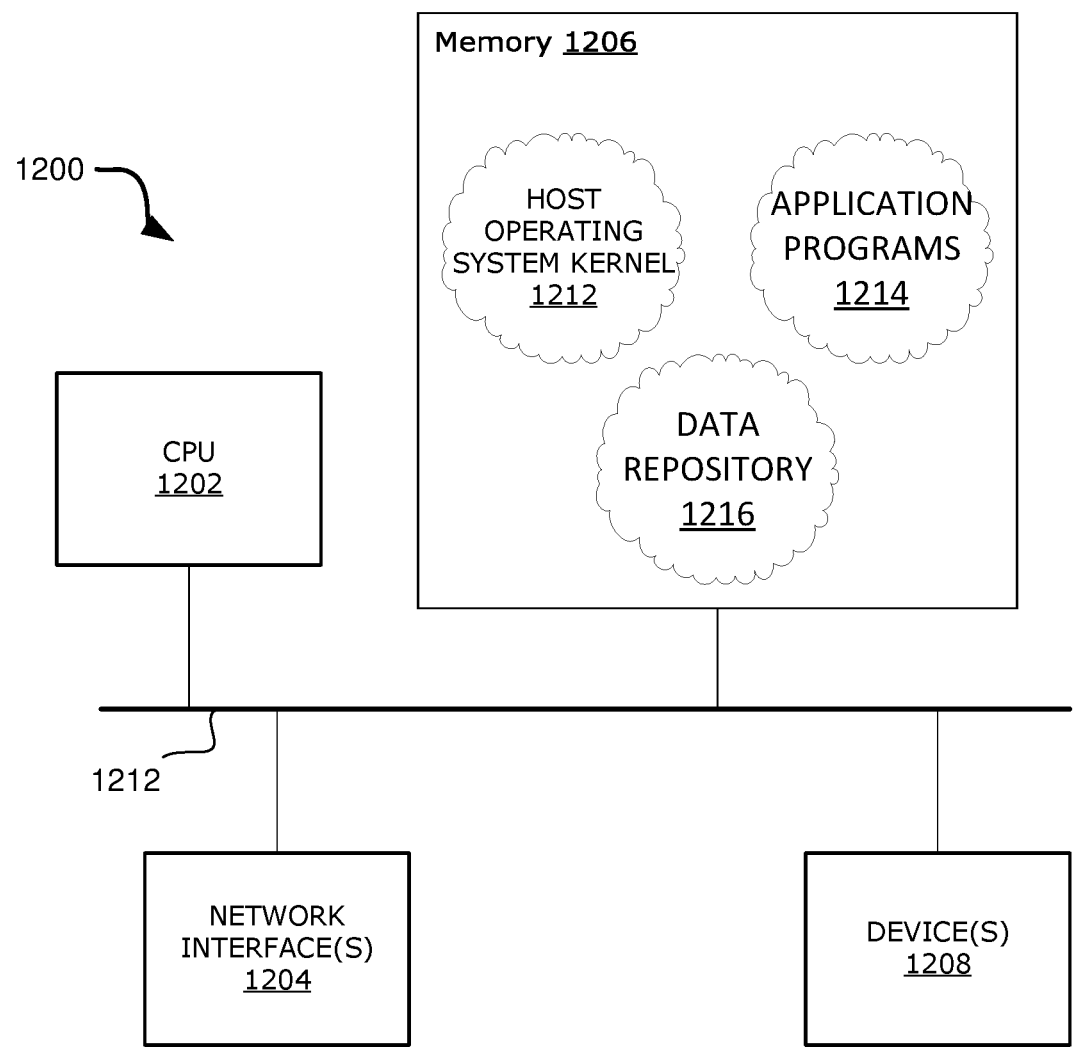
FIG. 12 is an example block diagram that illustrates a computing apparatus that may be advantageously used in implementing the invention.

FIG. 12 is a block diagram of computing apparatus 1200 that may be advantageously used to implement an MDC. The computing apparatus 1200 includes one or more central processing units (CPUs) 1202, one or more network interfaces 1204, a memory 1208, and one or more devices 216 connected by a system interconnect 1212, such as a bus. The devices 1208 may include storage devices (e.g., disks, including hard disk drives and solid state drives), and/or other types of input/output (I/O) including user interface devices or peripheral devices. Each network interface 1204 may include one or more network ports containing the mechanical, electrical and signaling circuitry needed to connect the node to the network 230 (FIG. 1) to thereby facilitate communication over the network. To that end, the network interface 214 may be configured to transmit and/or receive messages using a variety of communication protocols including, inter alia, TCP/IP and HTTP.

The memory 1206 may include a plurality of locations that are addressable by the CPU(s) 1202 and the network interface(s) 1204 for storing software program code (including application programs) and data structures associated with the embodiments described herein. The CPU 1202 may include processing elements or logic adapted to execute the software program code, such as that of the software stack 300 illustrated in FIG. 3, and manipulate the data structures. Example CPUs may include families of instruction set architectures based on the x86 CPU from Intel Corporation of Santa Clara, Calif. and the x64 CPU from Advanced Micro Devices of Sunnyvale, Calif.

A host operating system kernel 1212, portions of which are typically resident in memory 1206 and executed by the CPU 1202, functionally organizes the computing apparatus 1200 by, inter alia, invoking operations in support of the application programs executing on the computing apparatus 1200. A suitable host operating system kernel 1212 may include the Windows® series of operating systems from Microsoft Corp of Redmond, Wash., the MAC OS® and IOS® series of operating systems from Apple Inc. of Cupertino, Calif., the Linux operating system, among others. Suitable application programs 1214 stored in memory 1206 may include proprietary software programs of FireEye, Inc., and commercially available software programs. Illustratively, the application programs 1214 may be implemented as user mode processes of the kernel 230. As used herein, a process (e.g., a user mode process) is an instance of software program code (e.g., an application program) executing in the operating system that may be separated (decomposed) into a plurality of threads, wherein each thread is a sequence of execution within the process. The memory 1206 also includes a data repository for storing various data and metadata as discussed hereinabove.

It can now be seen that the described embodiments of the invention seek to deceive delayed-activation malware by using time-dilation techniques to modify responses to time-related software calls and other "inquiries" undertaken by such malware. Aspects of the invention can also apply to detect other forms of malware so as to hide the fact that the malware is being processed within a malware detector or sensor. For example, where malware performs checks on IP addresses or other identifying information associated with a computing device on which it is being processed, these embodiments may provide false information in response to the checks ("modified response") so as to deceive the malware as to where it is being processed. For these purposes, a more generalized vocabulary is useful: an action controller (such as, for example, the above-described time controller) may include one or more monitoring agents and an action logic (such as, for example, the above-described time-dilation logic).

It will be apparent to those skilled in the art that other types of processing elements and memory, including various computer-readable media, may be used to store and execute program instructions pertaining to the embodiments described herein. Also, while the embodiments herein are described in terms of software program code and computer, e.g., application, programs stored in memory, alternative embodiments also include the code or logic embodied as modules consisting of hardware, software, firmware, or combinations thereof.

In the foregoing description, the invention is described with reference to specific example embodiments thereof. It will, however, be evident that various modifications and changes may be made thereto without departing from the broader spirit and scope of the invention as set forth in the appended claims. For instance, in lieu of or in addition to the MCD system 110₁-110₃ of FIG. 1, a malware analysis may be conducted within firewall or other components within the communication network that is adapted to conduct dynamic malware analysis through the optimized use of VMs. Further, while the foregoing description illustrates a hybrid technique wherein the time controller in the user mode or kernel mode layers is used in conjunction with the hypervisor in the hypervisor layer (or the time controller in the hypervisor layer), it is contemplated that a pure hypervisor-based solution or a pure guest OS solution may also be used separately.

What is claimed is:

1. A system to detect delayed activation malware comprising:

a processor; and a memory communicatively coupled to the processor, the memory comprises a plurality of time controllers including a first time controller implemented, at least in part, in a first layer corresponding to a user mode layer of a run-time environment and a second time controller implemented, at least in part, in a second layer corresponding to either a kernel mode layer or a hypervisor layer of the run-time environment, each of the first time controller and the second time controller includes one or more monitoring agents and time-dilation action logic being configured to respond to a time-related check with a false time to indicate a greater length of time has transpired than has actually transpired, wherein the run-time environment including (i) an application configured to process one or more specimens which potentially include the delayed activation malware, (ii) an operating system in communication with the application, and (iii) the one or more monitoring agents associated with each of the plurality of time controllers, each of the one or more monitoring agents to detect the time-related check for a different software component of the run-time environment, wherein the application, during execution, is configured to process the one or more specimens based at least in part on the false time, and at least the one or more monitoring agents of the first time controller are configured to monitor activity of the application during execution to detect, when the delayed activation malware is included in the one or more specimens, anomalous activity associated with the delayed activation malware.

2. The system of claim 1, wherein a monitoring agent of the one or more monitoring agents of the first time controller being located at the user mode layer and the one or more monitoring agents of the second time controller being located at the kernel mode layer.

3. The system of claim 1, wherein the run-time environment comprises a virtual run-time environment including a hypervisor, and at least one virtual machine in communication with the hypervisor.

4. The system of claim 3, wherein the one or more monitoring agents of the second time controller is configured so as to be operable in association with a software component of the run time environment comprising the hypervisor, so as to be able to hook time checks originating from the software component.

5. The system of claim 1, wherein the plurality of time controllers further include a third time controller that comprises one or more monitoring agents operable in associated with a kernel memory space of a host operating system and the run-time environment further comprises a host operating system.

6. The system of claim 1, wherein a monitoring agent of the one or more monitoring agents and the time-dilation action logic of the second time controller are both operable in association with the hypervisor.

7. The system of claim 3, wherein a monitoring agent of the one or more monitoring agents and time-dilation action logic of the first time controller are operable in association with at least: the application.

8. The system of claim 1, wherein the application is configured to use a clock reflecting the false time, and the operating system is configured to use a clock reflecting a real time.

9. The system of claim 5, wherein the application and operating system reside in guest memory space and are configured to use a clock reflecting the false time, and the host operating system is configured to access and use a clock reflecting a real time.

10. The system of claim 1, wherein the time-dilation action logic of each of the first time controller and the second time controller is further configured to provide a false time in response to a software call from the application comprising the time- related check.

11. The system of claim 1, wherein the first time controller and the second time controller share the same time-dilation action logic.

12. The system of claim 1, wherein the time-dilation action logic of the first time controller and the second time controller is configured to determine a delay period for purposes of time dilation to be used in generating the false time.

13. The system of claim 1, further comprising a primary controller adapted to communicate with the first time controller and the second time controller, wherein the primary controller is configured to selectively enable and disable each of the first time controller and a corresponding first time-dilation action logic and the second time controller and a corresponding first time-dilation action logic.

14. The system of claim 13, wherein, when the first time controller is enabled, the time-dilation logic of the first time controller responds to the time check from the run-time environment.

15. The system of claim 13, wherein the run-time environment comprises a hypervisor which comprises the primary controller.

16. The system of claim 13, wherein the first time controller comprises the primary controller.

17. The system of claim 13, wherein the primary controller is configured to enable both the first time controller and the second time controller, the time-dilation action logic of the first time controller and the second time controller are configured to provide time dilation action when enabled such that the false time reflects both the time dilation actions of the first time controller and the second time controller.

18. The system of claim 13, wherein the time-dilation action logic of the first time controller and the time-dilation action logic of the second time controller are each configured to determine a delay period for purposes of time dilation to be used in generating the false time, and the primary controller is adapted to configure the first time controller and the second time controller with runtime rules for the first time controller and the second time controller to use in determining the delay period.

19. The system of claim 18, wherein the run-time rules are pre-set.

20. The system of claim 18, wherein the run-time rules are dynamically determined during run-time based on one or more factors including history of activation delays of known delayed activation malware.

21. The system of claim 13, wherein the primary controller is further configured to generate and store an action plan for exercising the one or more specimens so as to trigger activity of malware when included in the one or more specimens, and to configure the first time controller and the second time controller to execute the action plan, and wherein the action plan specifies an identifier of each of the plurality of time controllers to be enabled, and specific delay values to be reflected in the false time to cause the application to execute within a desired period of time.

22. A computer-implemented method to detect delayed activation malware comprising:
providing a first time controller operating as part of a user mode layer and a second time controller different and separate from the first time controller and operating as part of a kernel mode layer, each of the first time controller and the second time controller including a monitoring agent and time-dilation action logic in communication with the monitoring agent;
processing a specimen, which potentially includes the delayed activation malware, by a run-time environment including (i) an application, (ii) an operating system in communication with the application, and (iii) a plurality of monitors including the monitoring agents of the first time controller and the second time controller, wherein the application and the operating system comprising components of the run-time environment and each of the monitoring agents being configured so as to be operable in association with a different one of the components of the run-time environment;
hooking, by at least one of the monitoring agents, a time-related check by the run-time environment at the associated component;
responding to the time-related check by each time-dilation action logic of the first time controller and the second time controller with a false time to indicate a greater length of time has transpired than has actually transpired; and wherein the application, stored within a non-transitory storage medium and during execution, is configured to process the specimen based at least in part on the false time, and the monitoring agents of the run-time environment are configured to monitor activity of the application during execution to detect, when the delayed activation malware is included in the specimen, anomalous activity associated with the malware.

23. The method of claim 22, wherein the hooking of the time-related check further comprises hooking time checks originating from the application and the operating system by operating the monitoring agent of the first time controller in association with the application, and operating the monitoring agent of the second time controller in association with the operating system.

24. The method of claim 22, wherein the run-time environment comprises a virtual run-time environment including a hypervisor, and at least one virtual machine in communication with the hypervisor.

25. The method of claim 24, further comprising hooking time checks originating from a first component and a second component of the run-time environment by operating the monitoring agent of the first time controller in association with the first component comprising one of the application and the operating system, and operating the monitoring agent of the second time controller in association with the second component comprising the hypervisor.

26. The method of claim 24, wherein the run-time environment further comprises a host operating system, and the method further comprising operating the monitoring agent of the first time controller in a guest memory space of the host operating system, and operating the monitoring agent of the second time controller in a kernel memory space of the host operating system.

27. The method of claim 26, further comprising operating the monitor agent and time-dilation action logic of the first time controller in association with one of: the application, the operating system, the host operating system software, the hypervisor, and a virtualized device.

28. The method of claim 26, further comprising operating the monitor agent and time-dilation action logic of the first time controller in association with different ones of: the application, the operating system, the host operating system software, the hypervisor, and a virtualized device.

29. The method of claim 26, further comprising using, by the application, a clock reflecting the false time, and using, by the operating system, a clock reflecting a different, real time.

30. The method of claim 26, further comprising using, by the application and the operating system, a clock reflecting the false time, and using, by the host operating system, a clock reflecting a different, real time.

31. The method of claim 22, further comprising providing the false time, by the time-dilation action logic of one of the first time controller and the second time controller, in a response to a software call from the application comprising the time-related check.

32. The method of claim 22, further comprising determining, by the time-dilation action logic of the first time controller and the second time controller, a delay period for purposes of time dilation to be used in generating the false time.

33. The method of claim 22, further comprising selectively enabling and disabling, by a primary controller, each of the time-dilation logic of the first time controller and the second time controller so as to provide a corresponding time dilation action reflected in the false time.

34. The method of claim 33, further comprising configuring, by the primary controller, the first time controller and the second time controller with runtime rules for use by the time-dilation action logic of the first time controller and the second time controller in setting the false time.

35. The method of claim 33, further comprising dynamically determining the run-time rules based on one or more factors including history of activation delays of known delayed activation malware.

36. The method of claim 22, further comprising generating and storing in a memory, by the primary controller, an action plan for exercising the specimen so as to trigger activity of malware when included in the specimen, and configuring the first time controller and the second time controller to execute the action plan, and wherein the action plan specifies an identifier of each of the plurality of time controllers to be enabled or disabled, and one or more specific delay values to be reflected in the false time to cause the application to process the specimen within a desired period of time.

37. A non-transitory storage medium forming a software stack including software that, upon execution by a processor, performs operations to detect delayed activation malware, the non-transitory storage medium comprising:

a first layer of the software stack corresponding to a user mode layer of a run-time environment, the first layer comprises an application instance configured to process one or more specimens which potentially include delayed activation malware, the first layer further comprises at least in part, a first time controller including at least a first monitoring agent; and a second layer of the software stack corresponding to either a kernel mode layer or a hypervisor layer of the run-time environment, the second layer comprises, at least in part, a second time controller including at least a second monitoring agent, wherein a time-dilation action logic being configured to respond to a time-related check with a false time to indicate that a greater length of time has transpired than has actually transpired, the time-related check being hooked by either the first monitoring agent being operable with a first software application instance or the second monitoring agent being operable with either an operating system when the second layer corresponds to the kernel mode layer or a hypervisor when the second layer corresponds to the hypervisor layer, and wherein the application, during execution, is configured to process the one or more specimens based at least in part on the false time, and at least the first monitoring agent of the run-time environment is configured to monitor activity of the application during execution to detect, when the delayed activation malware is included in the one or more specimens, anomalous activity associated with the delay activated malware.

38. The non-transitory storage medium of claim 37, wherein the time-dilation action logic comprises (i) a first time-dilation action logic, operating with the first monitoring agent that detect a time-related check, to respond with a false time to indicate that a greater length of time has transpired than has actually transpired, and (ii) a second time-dilation action logic, operating with the second monitoring agent that detects a time-related check, to respond with a false time.

39. The non-transitory storage medium of claim 37, wherein the run-time environment comprises a virtual run-time environment including the hypervisor, and at least one virtual machine in communication with the hypervisor.

40. The non-transitory storage medium of claim 37, wherein the second monitoring agent is operable with the hypervisor being a software component of the run-time environment.

41. The non-transitory storage medium of claim 37, wherein the second monitoring agent is operable with the operating system corresponding to a host operating system being software component of the run-time environment.

42. The non-transitory storage medium of claim 37, wherein the application is configured to use a clock reflecting the false time, and the operating system is configured to use a clock reflecting a real time.

43. The non-transitory storage medium of claim 37, wherein the first time controller and the second time controller share the same time-dilation action logic.

44. The non-transitory storage medium of claim 37, wherein the time-dilation action logic is configured to determine a delay period for purposes of time dilation to be used in generating the false time.

45. The non-transitory storage medium of claim 38, wherein at least the first time-dilation action logic of the first time controller is further configured to provide the false time in response to a software call from the application comprising the time-related check.

46. The non-transitory storage medium of claim 38, further comprising a primary controller configured to communicate with the first time controller and the second time controller, wherein the primary controller is configured to selectively enable and disable the first time controller and the second time controller.

47. The non-transitory storage medium of claim 46, wherein the primary controller is configured to selectively enable and disable the first time controller so as to selectively enable and disable the first time-dilation action logic.

48. The non-transitory storage medium of claim 46, wherein the primary controller is configured to selectively enable and disable the second time controller so as to selectively enable and disable the second time-dilation action logic.

49. The non-transitory storage medium of claim 38, further comprising a primary controller adapted to communicate with the first time controller and the second time controller, wherein the primary controller is configured to selectively enable one of the first time controller and the second time controller so as to selectively enable a corresponding one of the first time-dilation action logic and the second time-dilation action logic and selectively disable a remaining one of the first time controller and the second time controller so as to selectively disable a remaining one of the first time-dilation action logic and the second time-dilation action logic.

50. The non-transitory storage medium of claim 38, wherein the first time-dilation action logic and the second time-dilation action logic are each configured to determine a delay period for purposes of time dilation to be used in generating the false time, and the primary controller is adapted to configure the first time controller and the second time controller with runtime rules for the first time controller and the second time controller to use in determining the delay period.

51. The non-transitory storage medium of claim 50, wherein the run-time rules are pre-set.

52. The non-transitory storage medium of claim 50, wherein the run-time rules are dynamically determined during run-time based on one or more factors including history of activation delays of known delayed activation malware.

53. The system of claim 1, wherein the memory includes the first time controller that includes the one or more monitoring agents and the time-dilation action logic when the one or more monitoring agents of the first time controller are operative in association with the time-dilation action logic of the first time controller.

54. The method of claim 53, wherein the one or more monitoring agents of the first time controller are deployed as part of the first layer of the run-time environment corresponding to the user mode layer while the time-dilation action logic of the first time controller is deployed as part of the second layer of the run-time environment corresponding to either the kernel mode layer or the hypervisor layer.

55. The method of claim 1, wherein the one or more monitoring agents and the time-dilation action logic of the first time controller are associated with processes conducted at different layers of the run-time environment including at least the first layer and the second layer.

56. The method of claim 22, wherein the monitoring agent and the time-dilation action logic is included within the first time controller when the monitoring agent of the first time controller is operative in association with the time-dilation action logic of the first time controller.

57. The method of claim 56, wherein the monitoring agent of the first time controller is deployed within the user mode layer and the time-dilation action logic of the first time controller is deployed within the kernel mode layer.

58. The method of claim 22, wherein the monitoring agent and the time-dilation action logic of the first time controller are associated with processes conducted at different layers of the run-time environment including at least the user mode layer and the kernel mode layer of the run-time environment.

59. The non-transitory storage medium of claim 38, wherein the first time- dilation action logic is deployed within the first layer of the software stack and the second time-dilation action logic is deployed within the second layer of the software stack.

60. The non-transitory storage medium of claim 37, wherein a portion of the time-dilation action logic operating with the first monitoring agent is deployed within either the first layer of the software stack or the second layer of the software stack.

61. The non-transitory storage medium of claim 60, wherein a portion of the time-dilation action logic operating with the second monitoring agent is deployed within either the second layer of the software stack or the first layer of the software stack.

62. The non-transitory storage medium of claim 37, wherein the time-dilation action logic being deployed within either the first layer of the software stack or the second layer of the software stack.

* * * * *